United States Patent [19]
Nishimoto et al.

[11] Patent Number: 5,359,449
[45] Date of Patent: Oct. 25, 1994

[54] OPTICAL MODULATOR FOR AN OPTICAL TRANSMITTER

[75] Inventors: Hiroshi Nishimoto; Hironao Hakogi; Takatoshi Minami, all of Kawasaki, Japan

[73] Assignee: Fujitsu Limited, Kawasaki, Japan

[21] Appl. No.: 979,491

[22] Filed: Nov. 19, 1992

[30] Foreign Application Priority Data

| Nov. 19, 1991 | [JP] | Japan | 3-302893 |
| Dec. 5, 1991 | [JP] | Japan | 3-322033 |
| Feb. 14, 1992 | [JP] | Japan | 4-027755 |

[51] Int. Cl.⁵ ............................ H04B 10/04
[52] U.S. Cl. ............................ 359/181; 359/245; 359/182; 385/2; 385/9
[58] Field of Search ........... 359/180, 181–183, 359/187, 161, 154, 140, 245; 385/2, 9; 372/26

[56] References Cited

U.S. PATENT DOCUMENTS

| 4,805,235 | 2/1989 | Henmi | 359/182 |
| 4,893,352 | 1/1990 | Welford | 359/182 |
| 5,008,957 | 4/1991 | Kiyono | 359/181 |
| 5,170,274 | 12/1992 | Kuwata et al. | 359/182 |

FOREIGN PATENT DOCUMENTS

| 0304602 | 3/1989 | European Pat. Off. . |
| 0387832 | 9/1990 | European Pat. Off. . |
| 0444688 | 9/1991 | European Pat. Off. . |
| 2642857 | 8/1990 | France . |
| 61-32814 | 2/1986 | Japan . |
| 2291518 | 3/1990 | Japan | G02F 1/03 |
| 2165117 | 6/1990 | Japan | G02F 1/03 |
| 3251815 | 11/1991 | Japan | G02F 1/03 |
| 424610 | 1/1992 | Japan | G02F 1/03 |
| 434516 | 5/1992 | Japan | G02F 1/035 |

*Primary Examiner*—Richard E. Chilcot, Jr.
*Assistant Examiner*—K. Negash

[57] ABSTRACT

An optical transmitter having a Mach-Zehnder optical modulator comprising a signal electrode fed with a driving signal for effecting modulation and a bias electrode for operating point control. Because the signal electrode and the bias electrode are independent of each other, a driving circuit and the signal electrode can be connected in a DC setup. This permits stable operating point control and improves waveform characteristics.

23 Claims, 21 Drawing Sheets

—$\phi_{10}$

—$\phi_{20}$

—$\pi$
—$\phi_{10}-\phi_{20}$
—0

OPTICAL MODULATOR FOR AN OPTICAL TRANSMITTER

BACKGROUND OF THE INVENTION

1. Field of the Invention

The present invention relates to an optical transmitter for use with an optical communication system and, more particularly, to improvements of an optical modulator having an optical modulator.

Heretofore, optical transmitters used by optical communication systems have adopted the so-called direct modulation as their operating principle. The method involves modulating the current that flows through laser diodes by use of data signals. A major drawback of direct modulation is the difficulty in implementing long-distance data transmission due to wavelength dispersion. Efforts of recent years to circumvent the disadvantage have led to the development of external modulation. This is the kind of optical modulation that is highly immune to the adverse effects of wavelength dispersion over optical fiber cables. For example, what is known as the LiNbO$_3$ Mach-Zehnder modulator has drawn attention For its excellent modulation characteristic and high resistance to wavelength dispersion. Optical transmitters based on the external modulation principle are subject to a number of requirements: (a) the operating point of the optical modulator should be controlled to be stable; (b) the optical modulator should be driven with a low voltage; (c) there should be minimum waveform distortion attributable to the capacitor between a driving circuit and the electrodes of the optical modulator as well as to the capacitor between the electrodes and a terminating resistor; and (d) there should be minimum changes in modulation characteristic which are attributable to abrupt changes in the so-called mark rate. It is also required that the presence or absence of chirping (dynamic wavelength fluctuation) in the optical signal output by the optical modulator be optional. For example, where long-distance transmission is effected using a wavelength that approximately matches the zero-dispersion wavelength of the optical fiber and where the dispersion value can be either positive or negative, there should be no chirping. On the or, her hand, where the polarity of the wavelength dispersion off the optical fiber is predetermined and where optical pulse compression may be effected using a kind of chirping that corresponds to the dispersion polarity, the presence of chirping should be selected.

2. Description of the Related Art

The typical Mach-Zehnder modulator comprises an input port that receives light from a light source, a pair of branching waveguides that transmit the light received through the input port after branching the light in two directions, an output port that converges the branched light streams coming out of the branching waveguides, and electrodes that give phase change to the light transmitted through the branching waveguides. When the light streams from the branching waveguides converge in phase (with a phase difference of $2n\pi$, n being an integer), the light output is turned on; when the light streams converge opposite to each other in phase (with a phase difference of $(2n+1)\pi$, n being an integer), the light output is turned off. Thus intensity modulation is performed by varying the voltage given to the electrodes by use of an input signal. Where the voltage fed to the electrodes varied as per the input signal, it is necessary to compensate for the operating point drift of the optical modulator caused by temperature fluctuation and other ambient conditions. One way to do this is first to supply the electrodes with a bias voltage such as to keep the operating point where optimum and then to superimpose a signal onto the bias voltage so that the output light is turned on and off while the operating point is being held in its optimum position. Prior art techniques of the above kind for stabilizing the operating point of the optical modulator are described illustratively in Japanese Patent Laid-Open No. 49-42365 and in Japanese Patent Laid-Open No. 3-251815.

Also known is a Mach-Zehnder optical modulator of a symmetrical dual electrode driving type designed to lower the voltage to a signal electrode of the optical modulator and to eliminate chirping in the modulated output light. That is, the branching waveguides have a signal electrode each. These electrodes are fed with driving voltages opposite to each other in phase. This technique is disclosed illustratively in Technical Digest of IOOC' 89, 19D4-2, 1989, "Perfectly Chirpless Low Drive Voltage Ti:LiNbO$_3$ Mach-Zehnder Modulator with Two Traveling-Wave Electrodes".

U.S. patent application Ser. No. 07/662,412 discloses related techniques of the optical transmitter permitting the selection of the presence of absence of chirping.

The driving signal for optical modulation has a repetitive pulse waveform or an AC waveform, while the bias voltage for operating point control comes from a DC source. Thus the circuit for controlling the operating point is connected to the electrode in a DC setup, whereas the driving circuit is connected to the electrode in an AC setup via a capacitor for DC decoupling. Where the electrode of the optical modulator is built as a traveling-wave type, the electrode is connected to the terminating resistor also in an AC setup. If there exists a capacitor between the driving circuit and the electrode and/or between the terminating resistor and the electrode, the low-frequency component of the driving signal is cut off. This can promote distortion of the signal waveform of the modulated light upon abrupt change in the mark rate. If the frequency characteristic of the capacitor is insufficient, the waveform of the driving signal of as high as several Gb/s is distorted by the capacitor. That in turn distorts the waveform of the modulated light.

Whereas the symmetrical dual electrode type optical modulator may lower the driving voltage, its application to the optical transmitter with a stabilized operating point is yet to be implemented extensively.

SUMMARY OF THE INVENTION

It is therefore an object of the present invention to provide an optical modulator that has stable control on the operating point and has little waveform distortion against the change in the mark rate by eliminating the capacitor connecting the electrode of the optical modulator to the driving circuit.

It is another object of the invention to provide an optical transmitter that eliminates the capacitor connecting the electrode to the terminating resistor if the electrode is built as a traveling-wave type.

It is a further object of the invention to provide an optical modulator that lowers the driving voltage thereof.

It is yet another object of the invention to provide an optical modulator that permits easy selection of the presence or absence of chirping in the optical signal output thereof.

In carrying out the invention and according to one aspect thereof, there is provided an optical modulator comprising: a light source; a Mach-Zehnder optical modulator having an input port which receives light from the light source, a first and a second branching waveguide which transmit the light supplied to the input port after branching the supplied light in two directions, an output port which converges the branched light from the first branching waveguide and the second branching waveguide before outputting the converged light, and a signal electrode and a bias electrode which are insulated from each other and which give phase change to the light transmitted through the first branching waveguide and the second branching waveguide; light branching means, connected operatively to the output port, for branching in two directions the light output by the output port; driving means, connected operatively to the signal electrode, for supplying the signal electrode with a driving signal based on an input signal; and operating point control means, connected operatively to the bias electrode, for supplying the bias electrode with a bias voltage controlled accordance with the light branched by the light branching means for control of the operating point of the Mach-Zehnder optical modulator.

According to another aspect of the invention, there is provided an optical modulator comprising: a light source; a Mach-Zehnder optical modulator, connected operatively to the light source, for modulating in intensity the light from the light source; and driving means, connected operatively to the Mach-Zehnder optical modulator, for supplying the optical modulator with a driving based on an input signal; the Mach-Zehnder optical modulator including: an input-side optical waveguide; a first branching portion for branching in two directions the light transmitted through the input-side optical waveguide; a first, and a second branching waveguide for transmitting the light branched by the first branching portion; a second branching portion for converging the light transmitted through the first branching waveguide and the second branching waveguide; an output-side optical waveguide for transmitting the light converged by the second branching portion; a first and a second loaded electrode loaded respectively onto the first branching waveguide and the second branching waveguide; a delay optical waveguide coupled directionally to at least one of the first branching waveguide and the second branching waveguide; and a control electrode for controlling the coupling ratio of the directional coupling between the branching waveguide and the delay optical waveguide.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 19A through 19G are views of waveforms generated by the optical transmitter of FIG. 18 as it is operating;

DESCRIPTION OF THE PREFERRED EMBODIMENT

The preferred embodiments of the invention will now be described in detail with reference to the accompanying drawings.

Figure 1:
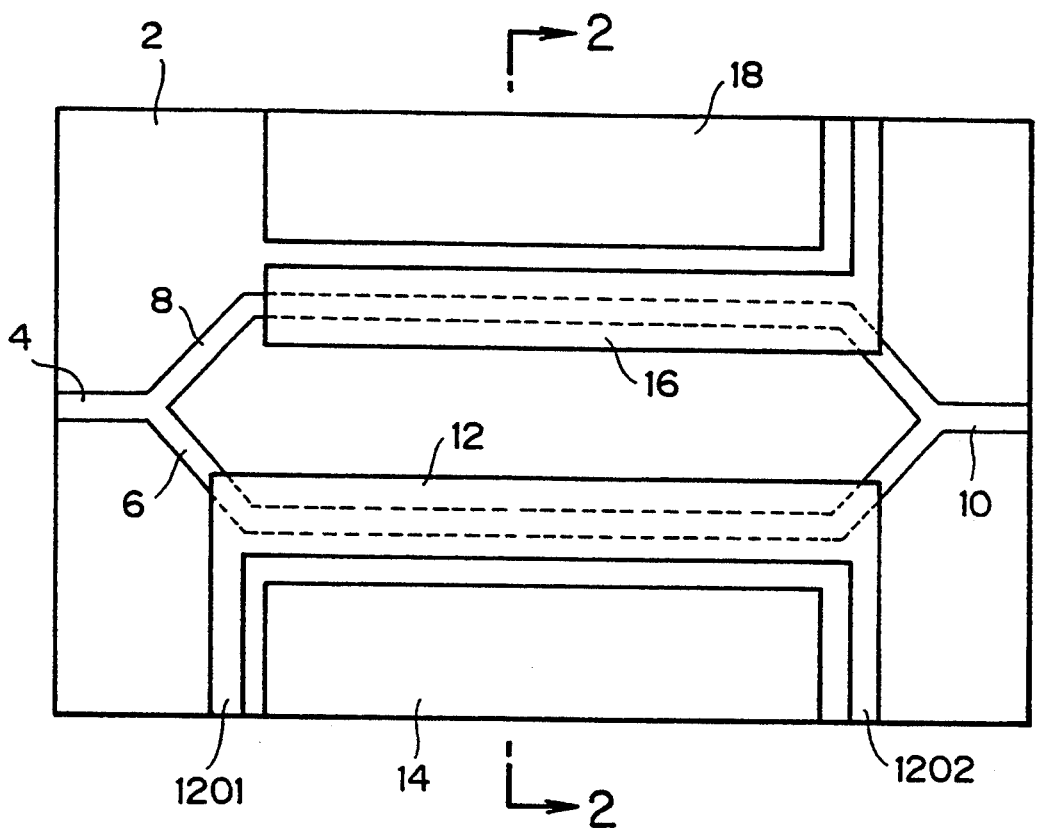
FIG. 1 is a plan view of a Mach-Zehnder optical modulator that may be used to practice the invention.
Figure 2:
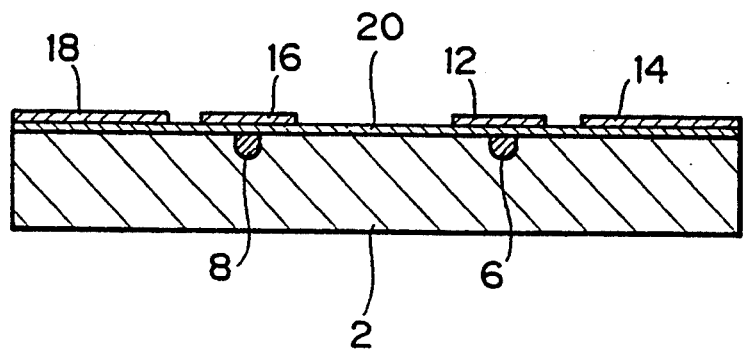
FIG. 2 is a cross-sectional view taken on line A—A of the optical modulator in FIG. 1.

FIG. 1 is a plan view of a Mach-Zehnder optical modulator that may be used to practice the invention, and FIG. 2 is a cross-sectional view taken on line A—A of that optical modulator. The optical modulator comprises a Z-cut type $LiNbO_3$ substrate into which titanium (Ti) is thermally dispersed to form optical waveguides thereon. The optical waveguides are loaded with electrodes. The optical waveguides formed on the substrate 2 include an input port 4 that receives light from a light source, not shown; a pair of branching waveguides 6 and 8 which transmit the light from the input port 4 after branching the received light in two directions; and an output port 10 that converges the branched light transmitted through the branching waveguides 6 and 8. The branching waveguides 6 and 8 are loaded respectively with a signal electrode 12 and a bias electrode 16. Reference numeral 14 indicates a grounding electrode located close to the signal electrode 12, while reference numeral 18 is a grounding electrode furnished close to the bias electrode 16. Although a buffer layer 20 composed primarily of $SiO_2$ is formed between each electrode and the substrate 2, this layer is omitted from FIG. 1 so as to maintain the visibility of other key components.

Figure 3:
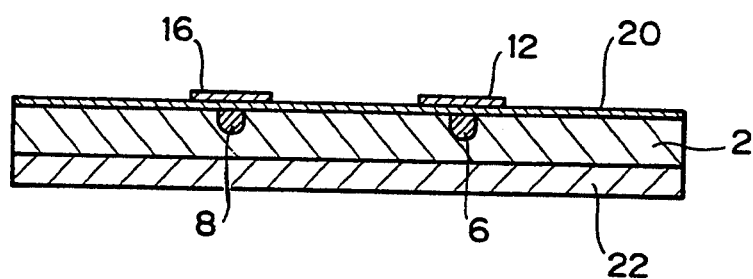
FIG. 3 is a cross-sectional view off another optical modulator that may be used to practice the invention.

A driving signal is applied across the signal electrode 12 to the grounding electrode 14, and a bias voltage is fed between the bias electrode 16 and the grounding electrode 18. The signal electrode 12 is built as a traveling-wave type that allows the electric field of the driving signal to travel in the same direction as that of the light through the branching waveguide 6. The driving signal is supplied from an upstream edge 1201 of the signal electrode 12. A downstream edge 1202 of the signal electrode 12 is provided with a terminating resistor, to be described later. Built as a traveling-wave type, the signal electrode 12 permits appreciably higher modulation than electrodes of other types. Because the substrate of this example is a Z-cut type, the branching waveguides 6 and 8 are loaded from directly above with the signal electrode 12 and bias electrode 16, respectively, with the grounding electrodes 14 and 18 located close to the electrodes 12 and 16, respectively. This arrangement permits effective application of the electric field to the branching waveguides 6 and 8. Where the substrate is made of Z-cut $LiNbO_3$, the electric field is applied effectively to the branching waveguides in the manner described below FIG. 3 is a cross-sectional view of another optical modulator that may be used to practice the invention. In this example, the branching waveguides 6 and 8 are loaded from directly above with the signal electrodes 12 and 16, respectively, and a common grounding electrode 22 is formed on the back side of the substrate 2. Forming the signal electrode, bias electrode and grounding electrode on different planes as illustrated still affords necessary phase change to the light transmitted through the branching waveguides.

Figure 4:
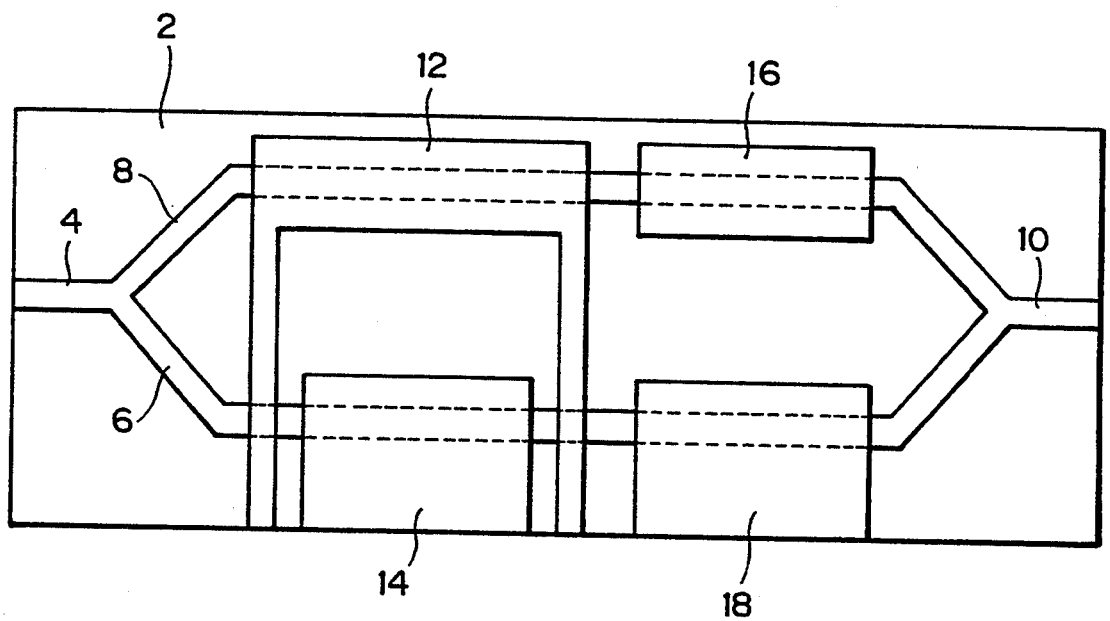
FIG. 4 is a plan view of another optical modulator that may be used to practice the invention.

FIG. 4 is a plan view of another optical modulator that may be used to practice the invention. While the typical optical modulators described so far have one of the two branching waveguides loaded with the signal electrode and the other loaded with the bias electrode, this optical modulator has one of the branching waveguides 8 loaded with the signal electrode 12 and bias electrode 16 and has the other branching waveguide 6 furnished with the grounding electrodes 14 and 18 corresponding respectively to the signal electrode 12 and bias electrode 16.

Where the signal electrode is insulated from the bias electrode as described, there may be various modes to choose from in which to construct the signal and bias electrodes. If optical waveguides are formed on a crystal plane other than the Z-cut plane of $LiNbO_3$, the electrode layout may be varied so as to permit optimally effective application of the electric field. For example, the electrodes may be formed alongside of the branching waveguides.

The mutually isolated signal electrode and bias electrode characterize the Mach-Zehnder optical modulator. The advantages of this type of modulator are highlighted illustratively by describing the operating characteristic of an ordinary optical modulator in which the signal and bias electrodes are integrally furnished One such ordinary optical modulator may be the one in FIG. 4 minus the bias electrode 16 and grounding electrode 18.

Figure 5:
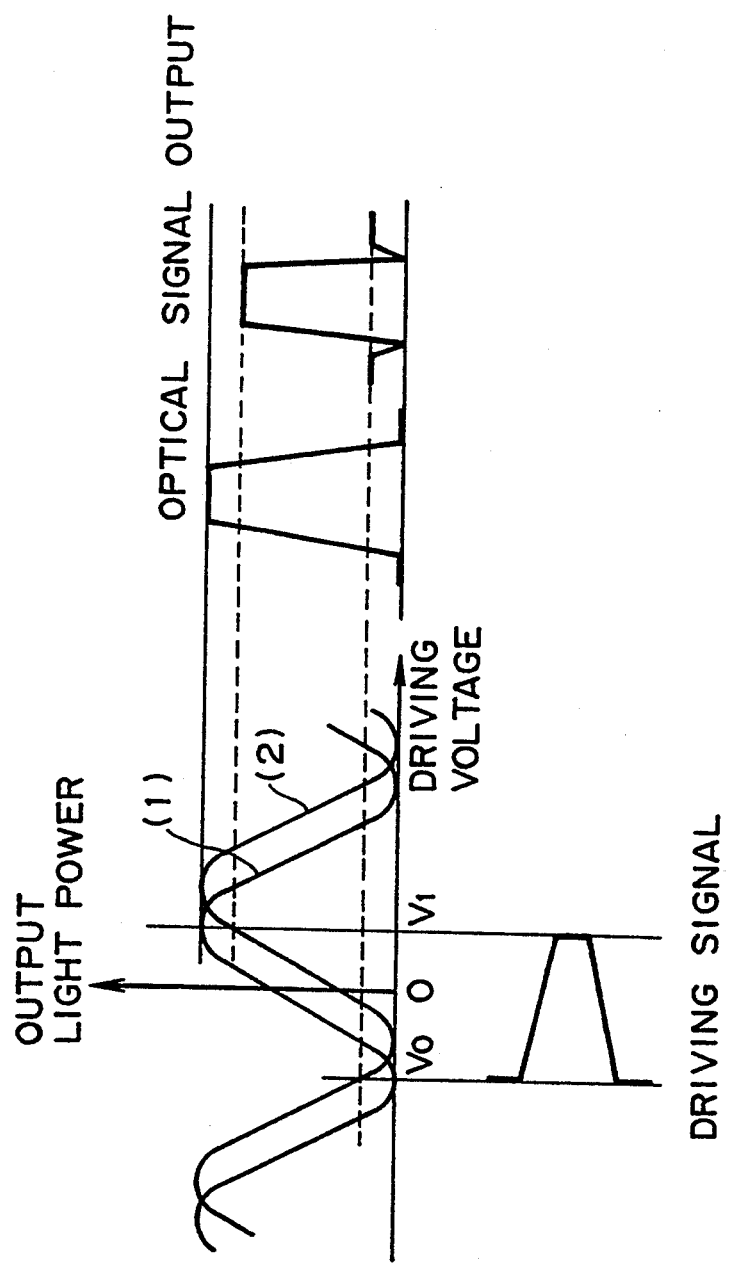
FIG. 5 is a view illustrating the input/output characteristic of a Mach-Zehnder optical modulator.

FIG. 5 illustrates the input/output characteristic of a typical Mach-Zehnder optical modulator. In FIG. 5, reference numeral (1) indicates the characteristic in effect before an operating point drift occurs, and reference numeral (2) points to the characteristic in effect after an operating point drift has occurred. The operating point drift refers to a drift in the direction of voltage increase or decrease along the operation characteristic curve indicating the relationship between output light power and driving voltage. As depicted, the operation characteristic curve of the Mach-Zehnder optical modulator has periodicity with respect to the voltage change. Thus the use of driving voltages $V_0$ and $V_1$ for which the output light power is both minimized and maximized permits efficient binary modulation. With the optical signal output by that Mach-Zehnder optical modulator, the driving voltages $V_0$ and $V_1$ staying constant upon occurrence of an operating point drift cause waveform distortion and extinction ratio deterioration due to the above-mentioned periodicity. Where the operating point drift is represented by $dV$, the drift should preferably be compensated by calculations of $V_0+dV$ and $V_1+dV$, where $V_0$ and $V_1$ are the driving voltages. One known method for controlling the operating point in compensation for its drift is described illustratively in Japanese Patent Laid-Open No. 49-42365. This method involves driving the optical modulator by superimposing a low-frequency signal onto one of the two logic levels of a driving signal. The operating point is then controlled by use of the phase of the low-frequency signal detected from the optical signal output. However, in the case of asymmetrical modulation involving the superimposing of the low-frequency signal onto one of the two logic levels of the driving signal (here, "modulation" refers not to the modulation for signal transmission but to the modulation based on a low-frequency signal for operating point control), the optimum operating point may not be maintained if the rise time or fall time of the input signal is significantly long (the reason for this will be discussed later in quantitative terms). As disclosed in Japanese Patent Laid-Open No. 3-251815, there is a prior art method of symmetrical modulation for operating point control whereby waveform distortion of the output optical signal and extinction ratio deterioration following the operating point drift are prevented without regard to the input signal. How the symmetrical modulation method is practiced and how it works will be described below in detailed quantitative terms because a study of this method is deemed indispensable for better understanding the advantages of the present invention.

Figure 6:
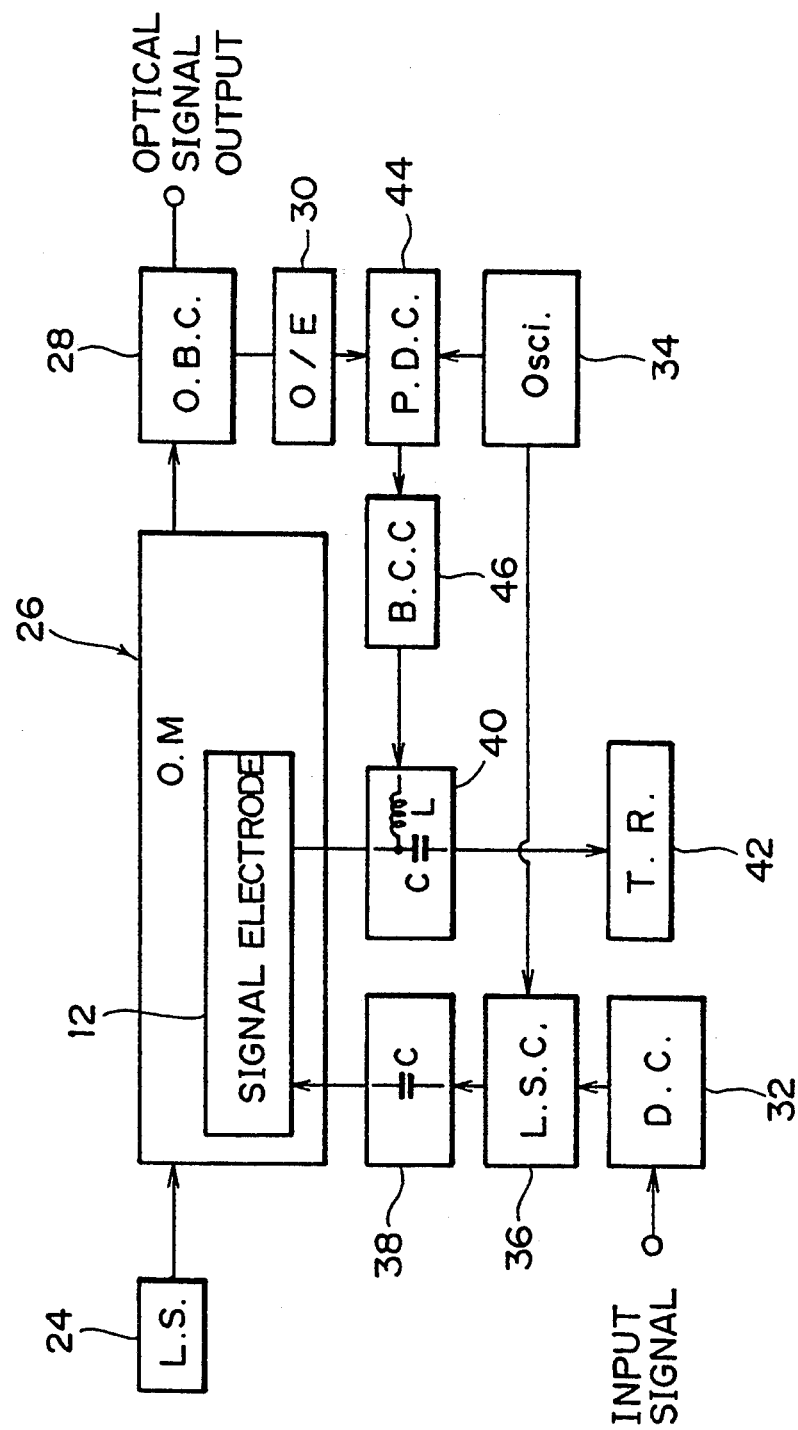
FIG. 6 is a block diagram of an optical transmitter used to implement symmetrical modulation.

FIG. 6 is a block diagram of an optical transmitter used to implement symmetrical modulation. In FIG. 6, a Mach-Zehnder optical modulator 26 having a signal electrode 12 is supplied with light from a light source 24. The output light from the optical modulator 26 is branched in two directions by an optical branching circuit 28. One of the two light streams branched by the optical branching circuit 28 is used as an optical signal output, and the other light stream is converted to an electrical signal by an optical-to-electrical signal converter 30. A low-frequency superimposing circuit 36 superimposes a low-frequency signal from an oscillator 34 onto a driving signal from a driving circuit 32. After the superimposing of the low-frequency signal, the driving signal is fed to the signal electrode 12 via a capacitor C of a bias tee 38. The output terminal of the signal electrode 12 is connected via a capacitor C of a bias tee 40 illustratively to a 50-ohm terminating resistor 42. A phase detecting circuit 44 compares in phase the frequency component of the low-frequency signal in the electrical signal from the optical-to-electrical signal converter 30 with the low-frequency signal from the oscillator 34. The phase detecting circuit 44 then outputs a DC signal whose polarity is determined by the direction of the operating point drift and whose level depends on the magnitude of the drift. A bias control circuit 46 provides feedback control on the bias voltage to the signal electrode 12 in such a way that the DC signal coming from the phase detecting circuit becomes zero.

Figure 7:
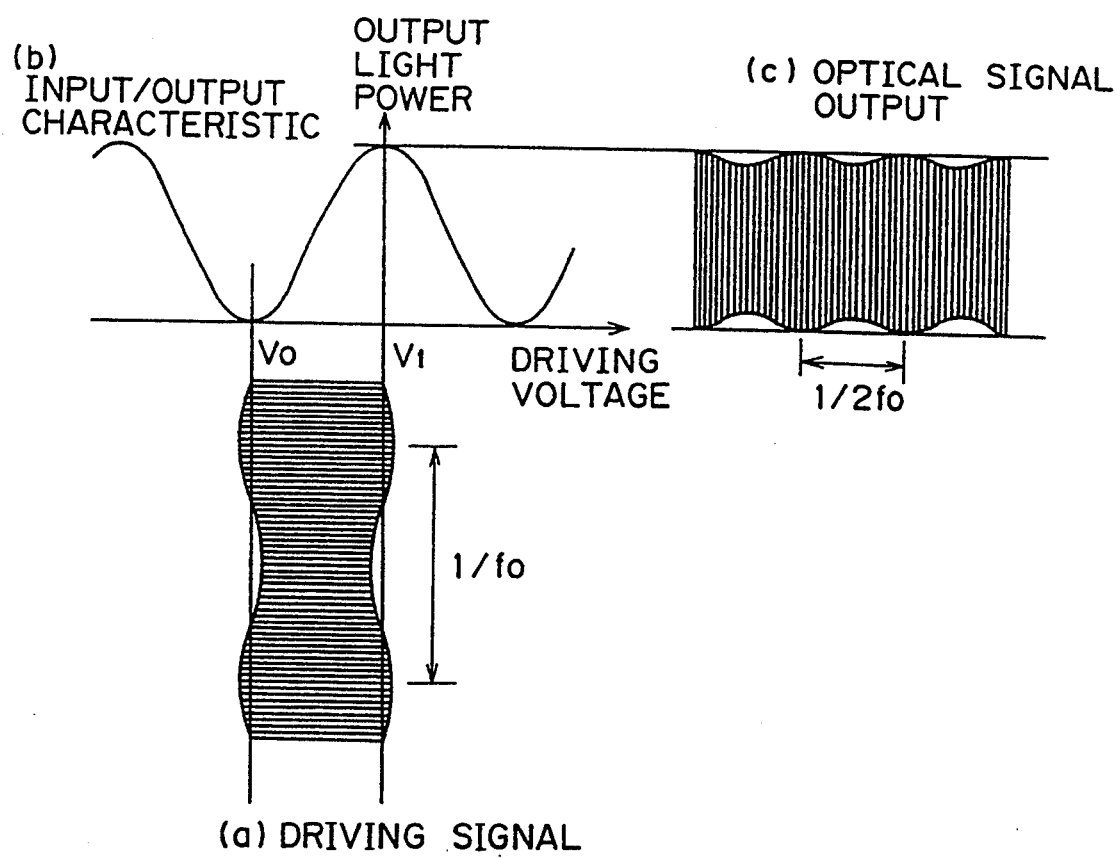
FIG. 7 is a set of views depicting the waveforms of an optical signal output from the optical transmitter of FIG. 6.
Figure 8:
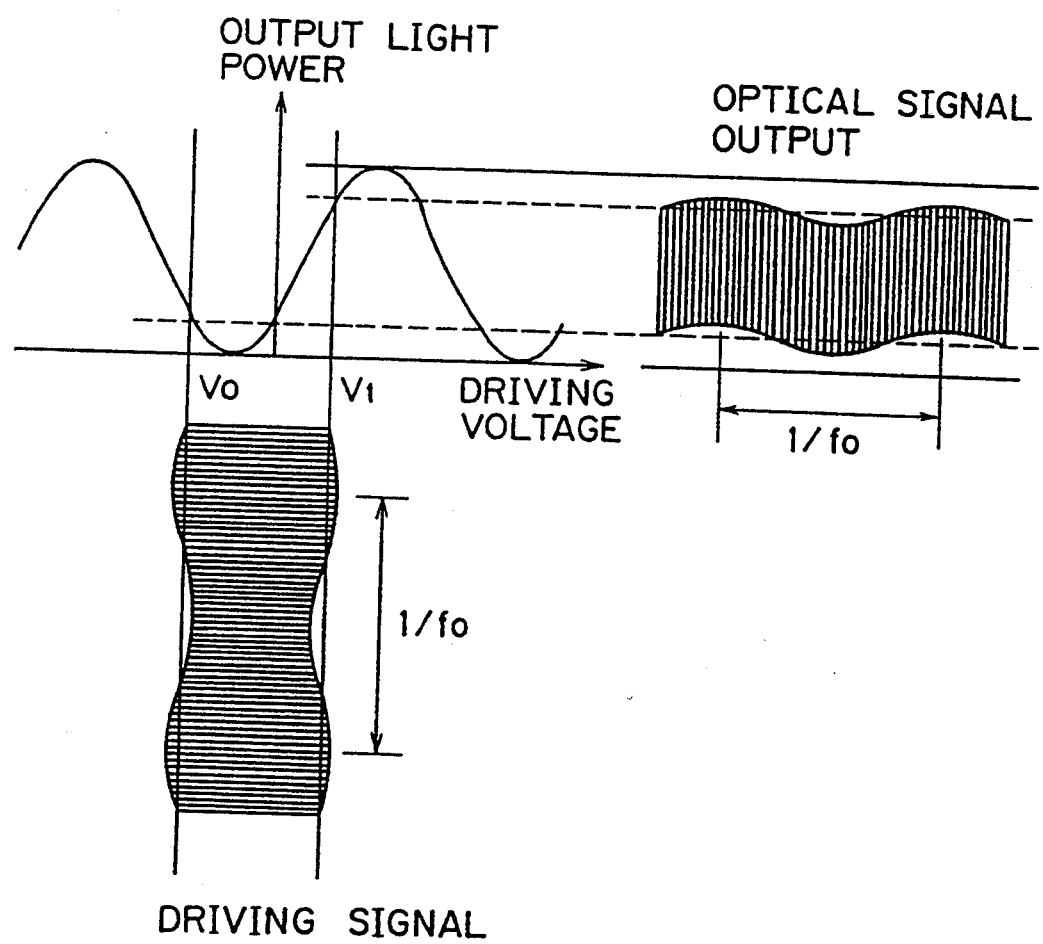
FIGS. 8 and 9 are views illustrating the waveforms of optical signal outputs effected by the optical transmitter of FIG. 6 when the transmitter develops an operating point drift in the positive and negative directions.
Figure 9:
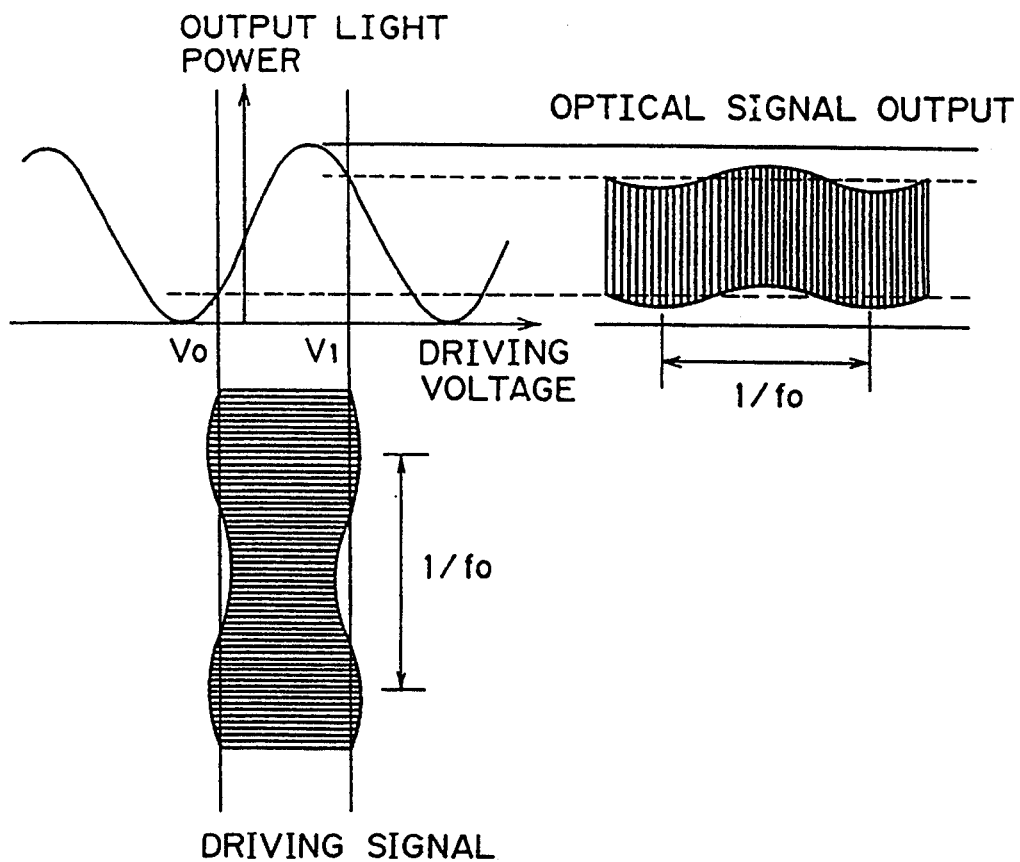

As indicated by (a) in FIG. 7, the waveform of the driving signal to be converted to an optical signal by the Mach-Zehnder optical modulator 26 shows that low-frequency signals are superimposed opposite to each other in phase on the space side and the mark side of the driving signal (i.e., symmetrical modulation). When this driving signal drives the optical modulator 26 having input/outpost characteristic (operation characteristic curve) indicated by (b) in FIG. 7, the optical modulator 26 yields an output optical signal. As illustrated by (c) in FIG. 7, this output optical signal is a signal that is amplitude-modulated with a signal having a frequency of 2 $f_0$ ($f_0$ is the frequency of the low-frequency signal). Where there is no operating point drift, the driving voltages $V_0$ and $V_1$ matching the two logic levels of the input signal correspond to the minimum and maximum values located adjacent to one another along the operation characteristic curve. Thus in the output optical signal, the envelope on the space side becomes opposite in phase to the envelope on the mark side, and the frequency of the superimposed component is 2 $f_0$. It follows that the frequency component of $f_0$ is not detected from the output of the optical-to-electrical signal converter 30. But if an operating point drift occurs, the space-side envelope and the mark-side envelope in the output optical signal become in phase with each other, as depicted in FIGS. 8 and 9. The mean power of the output optical signal varies at a frequency $f_0$ depending on the above-described in-phase modulation. The phase of the frequency component $f_0$ becomes 180 degrees different in accordance with the direction of the operating point drift. Thus from the output of the phase detecting circuit 44 emerges the DC signal whose polarity is determined by the phase difference between the frequency component $f_0$ and the low-frequency signal from the oscillator 34 and whose level depends on the magnitude of the operating point drift. In accordance with the signal reflecting the operating point drift, the bias control circuit 46 controls the bias voltage in such a manner that the frequency component $f_0$ is not included in the optical signal, with the result that the operating point drift is optimally compensated.

The operating principle of operating point control based on symmetrical modulation will now be described in quantitative terms. Suppose that the amplitude of the driving signal is given as $$V\pi(=|V_0-V_1|)$$

Suppose also that P(V) represents the power of the output optical signal normalized with its peak value, and that V denotes the driving voltage normalized with $V\pi$. Then the input/output characteristic of the optical modulator 26 is given as $$P(V)=(1-cos(\pi(V-Vd)))/2 \quad (1)$$

where, Vd is the operating point drift voltage normalized with $V\pi$. Suppose that the driving signal is amplitude-modulated with a modulation factor m by use of a low-frequency signal having a frequency of $f_0$ ($=\omega_0/2\pi$). If this modulation is symmetrical modulation, the driving voltages $V_0$ and $V_1$ corresponding respectively to the logic levels of 0 and 1 of the input signal are given as $$V_0=msin(\omega_0 t) \quad (2)$$

$$V_1=1-msin(\omega_0 t) \quad (3)$$

If the modulation factor m is sufficiently small, those power levels $P_0$ and $P_1$ of the output optical signal which correspond to the two logic levels are given by the following approximate expressions:

$$\begin{aligned} P_0 &= P(V_0) \\ &\approx (1 - cos(\pi\ Vd) - \\ &\quad \pi\ msin(\omega_0 t)sin(\pi\ Vd))/2 \end{aligned} \quad (4)$$

$$\begin{aligned} P_1 &= P(V_{11}) \\ &\approx (1 + cos(\pi\ Vd) - \\ &\quad \pi\ msin(\omega_0 t)sin(\pi\ Vd))/2 \end{aligned} \quad (5)$$

In addition, the following approximate expression gives the mean power $P_2$ of the output optical signal at a rise time and a fall time of the input signal:

$$\begin{aligned} P_2 &= \frac{1}{V_1 - V_0} \int_{V_0}^{V_1} P(V)dV \\ &= 1/2 - cos(\pi\ V_0)sin(\pi\ Vd)/(\pi(1-2V_0)) \\ &\approx 1/2 - ((1 + 2msin(\omega_0 t))/\pi)sin(\pi\ Vd) \end{aligned} \quad (6)$$

Figure 10:
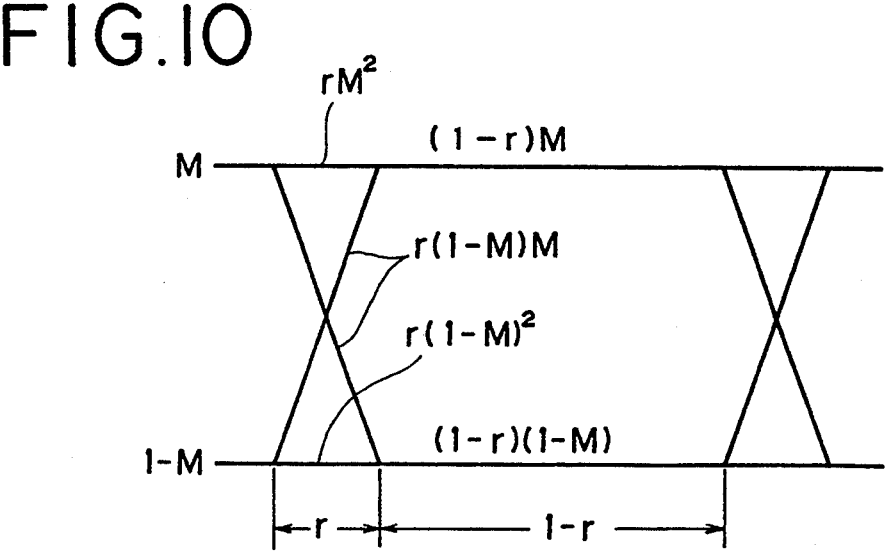
FIG. 10 is a view illustrating typical probabilities of occurrence of the space portion, mark portion, and leading and trailing portion of an eye pattern.

FIG. 10 illustrates typical probabilities of occurrence of the space portion ($P_0$), mark portion ($P_1$), and leading and trailing portion ($P_2$) of an eye pattern. In FIG. 10, M denotes the mark rate of the input signal, and r represents the constant that defines the relationship between the bit rate $f_b$ of the input signal on the one hand, and the rise and fall time ($=r(1f_b)$) of the input signal on the other. The expression below calculates the power $P_{av}$ of the output optical signal averaged over a time sufficiently shorter than the period of the low-frequency signal ($=1f_0$) by use of the probabilities of occurrence in FIG. 10:

$$P_{av} = (r(1-M)^2 + (1-r)(1-M))P_0 + \qquad (7)$$
$$(rM^2 + (1-r)M)P_1 + 2r(1-M)MP_2$$
$$= K_0 P_0 + K_1 P_1 + K_2 P_2$$

where, $K_0$, $K_1$ and $K_2$ are proportional constants. The following expression calculates the component P of the frequency $f_0$ of the low-frequency signal contained in the power $P_{av}$ of the output optical signal:

$$P = -\{((r(1-M)^2 + (1-r)(1-M)) + \qquad (8)$$
$$(rM^2 + (1-r)M)(\pi/2) +$$
$$2r(1-M)M(\pi/2)\} \times$$
$$m\sin(\pi Vd)\sin(\omega_0 t)$$

Thus the component P of the frequency $f_0$ has a phase difference of 180 degrees depending on the direction of the operating point drift (i.e., polarity of Vd). If the frequency component P is multiplied by a reference frequency $\sin(\omega_0 t)$, a positive or negative DC component may be detected depending on the direction of the operating point drift. That is, maintaining the DC component to zero allows the operating point to be held optimum. From Expression (8), P=0 if Vd=0. In this manner, the operating point is controlled optimally without regard to the mark rate M and the rise/fall time r varying with the waveform of the input signal.

The operating principle of operating point control based on asymmetrical modulation may be described in the same quantitative terms as with symmetrical modulation. What follows is a description of major differences between the two kinds of modulation, and any repetitive descriptions will be omitted. In the case of asymmetrical modulation, Expressions (2), (4), (6) and (8) are replaced respectively with the following expressions:

$$V_0 = 0 \qquad (2')$$
$$P_0 = (1 - \cos(\pi Vd))/2 \qquad (4')$$
$$P_2 = \frac{1}{V_1 - V_0} \int_{V_0}^{V_1} P(V)dV \qquad (6')$$
$$= \frac{1}{2} - \frac{\sin(\pi(V_1 - Vd)) + \sin(\pi Vd)}{2\pi V_1}$$
$$\approx \frac{1}{2} - \frac{\sin(\pi Vd)}{\pi} -$$
$$\frac{m}{2\pi}(\pi\cos(\pi Vd) + 2\sin(\pi Vd))\sin(\omega_0 t) -$$
$$(1/2)\cos(\pi Vd)(m\sin(\omega_0 t))^2$$

$$P = -\{K_1(\pi/2)\sin(\pi Vd) + K_2(1/2\pi) \qquad (8')$$
$$(\pi\cos(\pi Vd) + 2\sin(\pi Vd))\} \times$$
$$m\sin(\omega_0 t)$$
$$= Km\sin(\pi Vd + \theta)\sin(\omega_0 t)$$

Values K and $\theta$ in Expression (8') are given by the following expressions:

$$K = ((K_2/2)^2 + (\pi K_1/2 + K_2/\pi)^2)^{\frac{1}{2}}$$

$$\theta = \tan^{-1}(\pi K_2/(\pi^2 K_1 + 2K_2))$$

Thus in the case of asymmetrical modulation, P=0 only when $\sin(\pi Vd + \theta)=0$, as evident from Expression (8'). The stable point is shifted by $-\theta/\pi$ from the optimum operating point. This can lead to waveform distortion and extinction ratio deterioration depending on the rise time, fall time and mark rate of the input signal.

In the optical transmitter of FIG. 6, the driving signal with the low-frequency signal superimposed thereon is supplied via the capacitor C to the signal electrode 12 of the optical modulator 26 for two objectives. One objective is to prevent the DC bias voltage fed to the driving circuit 32 from adversely affecting the stable performance of the transmitter. The other objective is to acquire a symmetrical driving waveform as indicated by (a) in FIG. 7, the waveform being specific to symmetrical modulation. A symmetrical driving waveform is obtained by causing the driving signal with the low-frequency signal simply superimposed thereon to pass through the capacitor C so as to remove the low-frequency component.

The removal of the capacitor brought about by the invention is effective in preventing the deterioration of the signal waveform caused by an insufficient frequency characteristic of the capacitor. Another benefit of the absence of the capacitor is the ability derived therefrom to prevent the deterioration of the signal waveform in case the mark rate abruptly changes. More specifically, where operating point control is effected based on symmetrical modulation, the operating point is controlled to be optimum even if the mark rate is other than $\frac{1}{2}$. Thus if the change in the mark rate is sufficiently delayed compared with the time constant of an operating point control loop, the signal waveform does not deteriorate. However, the signal waveform does deteriorate in case of a mark rate change that may occur approximately between the time constant of the operating point control loop and the time constant corresponding to the frequency cut off by the capacitor. This is where the removal of the capacity called for.

Figure 11:
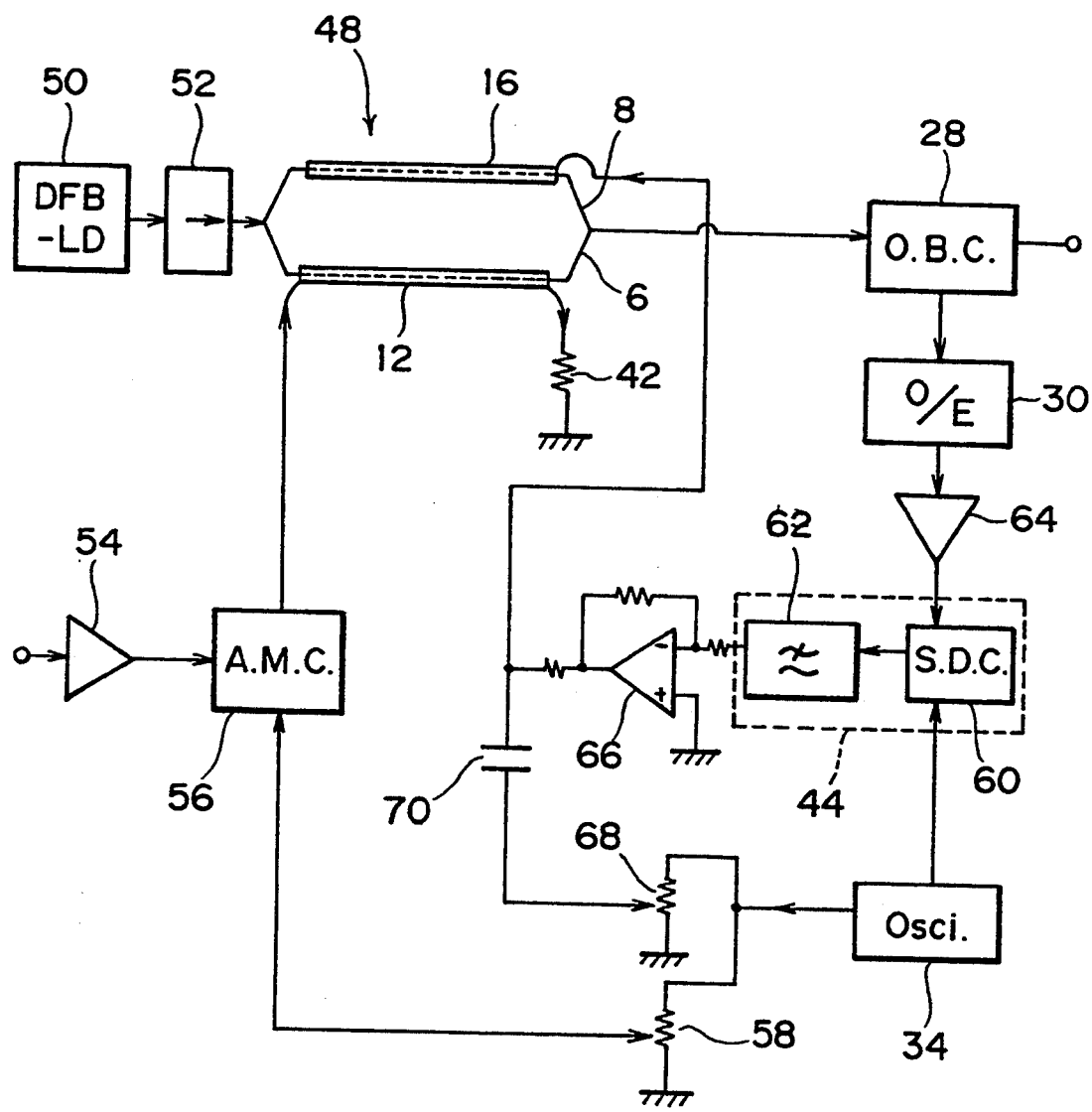
FIG. 11 is a block diagram of an optical transmitter practiced as a first embodiment of the invention.

FIG. 11 is a block diagram of an optical transmitter practiced as the first embodiment of the invention. In FIG. 11, reference numeral 48 is a Mach-Zehnder optional modulator having a signal electrode 12 and a bias electrode 16. This modulator has the same structure as that in FIG. 1. A distributed feedback laser diode 50 serves as the light source. The light from the laser diode 50 is fed to the optical modulator via an optical isolator 52. The light from the optical modulator 48 is branched in two directions by an optical branching circuit 28 composed primarily of an optical coupler arrangement. One of the branched light streams is transmitted as the optical signal output over an optical transmission path, not shown. The other light stream from the optical branching circuit 28 goes to an optical-to-electrical signal converter 30 comprising a photo-diode arrangement for conversion to an electrical signal. After conversion, the electrical signal is amplified by an amplifier 64 before reaching a phase detecting circuit 44. Reference numeral 54 is an amplifier circuit that acts as a driving circuit. The amplifier circuit 54 amplifies the input signal and outputs the result as a driving signal having a predetermined amplitude. Reference numeral 56 is an amplitude modulating circuit that serves as a low-frequency superimposing circuit for superimposing a low-frequency signal onto the driving signal from the amplifier circuit 54. A low-frequency signal from an oscillator 34 is supplied to the amplitude modulating circuit 56 via a variable resistor 58. The frequency of the low-frequency signal is set to be sufficiently lower (e.g., 100 kHz) than the frequency corresponding to the bit rate of the input signal. The variable resistor 58 adjusts the modulation factor of the amplitude modulation based on the low-frequency signal. The phase detecting circuit 44 con, pares in phase the frequency component of the low-frequency signal in the electrical signal from the optical-to-electrical signal converter 30 with the low-frequency signal from the oscillator 34. The phase detecting circuit 44 then outputs a DC signal whose polarity is determined by the direction of the operating point drift and whose level depends on the magnitude of the drift. The phase detecting circuit 44 includes a synchronous detecting circuit 60 and a low-pass filter 62. Reference numeral 66 is an operational amplifier that serves as a bias control circuit. The operational amplifier 66 feeds a bias voltage to the bias electrode 16 of the optical modulator 48 in such a manner that the supplied DC signal becomes zero. In this first embodiment wherein the driving signal is fed direct to the signal electrode 12, i.e., without passage through a capacitor, a symmetrical driving waveform is not obtained. To implement symmetrical modulation requires superimposing a low-frequency signal onto the bias voltage supplied to the bias electrode 16. Specifically, the low-frequency signal from the oscillator 34 is sent to the bias electrode 16 by way of the variable resistor 68 and a coupling capacitor 70.

How the optical transmitter of FIG. 11 works will be described. Because the advantages of symmetrical modulation have already been discussed in quantitative terms, what follows is a qualitative description of how symmetrical modulation is implemented based on the structure of FIG. 11.

Figure 12A:
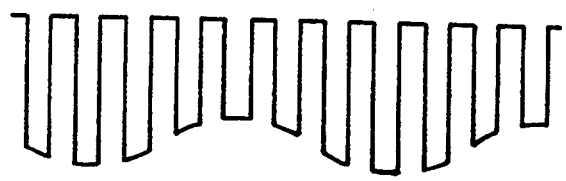
FIGS. 12A through 12E are views of waveforms generated by the optical transmitter of FIG. 11 as it is operating.
Figure 12B:
Figure 12C:
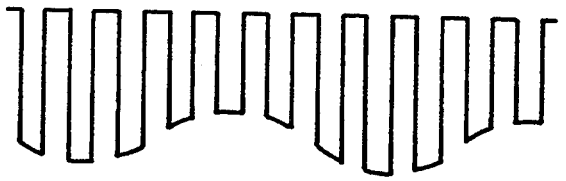
Figure 12D:
Figure 12E:
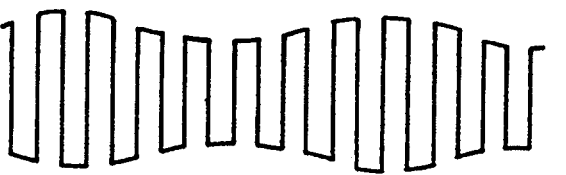

FIGS. 12A through 12E are views of waveforms generated by the optical transmitter of FIG. 11 when the transmitter is in operation. FIG. 12A shows a waveform of the driving signal as it is fed to the signal electrode 12, with 1's and 0's alternated FIG. 12B depicts a waveform of the bias voltage as it is supplied to the bias electrode 16. FIG. 12C illustrates an optical phase change $\phi_1$ of the branching waveguide 6 loaded with the signal electrode 12. FIG. 12D portrays an optical phase change $\phi_2$ of the branching waveguide 8 loaded with the bias electrode 16. FIG. 12E shows an optical phase difference ($\phi_1-\phi_2$) between the light streams from the branching waveguides 6 and 8 as the light streams converge. As illustrated in FIG. 12B, an AC signal in phase with the low-frequency signal and having a predetermined amplitude is superimposed onto the DC bias voltage. The amplitude of this AC signal is determined in such a way that the amplitude of the space-side envelope becomes the same as that of the mark-side envelope in the waveform of the phase difference between the converging light streams from the branching waveguides 6 and 8, as shown in FIG. 12E. The amplitude of the low-frequency signal superimposed onto the driving signal and the amplitude of the AC signal superimposed onto the bias voltage may be adjusted using the variable resistors 58 and 68 in FIG. 11. Where the optical modulator of FIG. 4 is used in which either of the branching waveguides 6 and 8 is loaded with the signal electrode 12 and bias electrode 16, the sum of the optical phase change caused by the signal electrode 12 and the optical phase change brought about by the bias electrode 16 corresponds to the optical output power. Thus the AC signal superimposed onto the bias voltage is set opposite in phase to the low-frequency signal superimposed onto the driving signal. Superimposing an AC signal having a predetermined phase and a predetermined amplitude onto the bias voltage implements symmetrical modulation on the same principle as with the optical transmitter of FIG. 6. That is, the operating point is controlled optimally without regard to the mark rate of the input signal and other parameters. Because the driving signal is fed to the signal electrode 12 without the intervention of a capacitor and because the signal electrode 12 and the terminating resistor 42 are connected in a DC setup, the signal waveform will not deteriorate even if the mark rate of the input signal changes abruptly.

Figure 13:
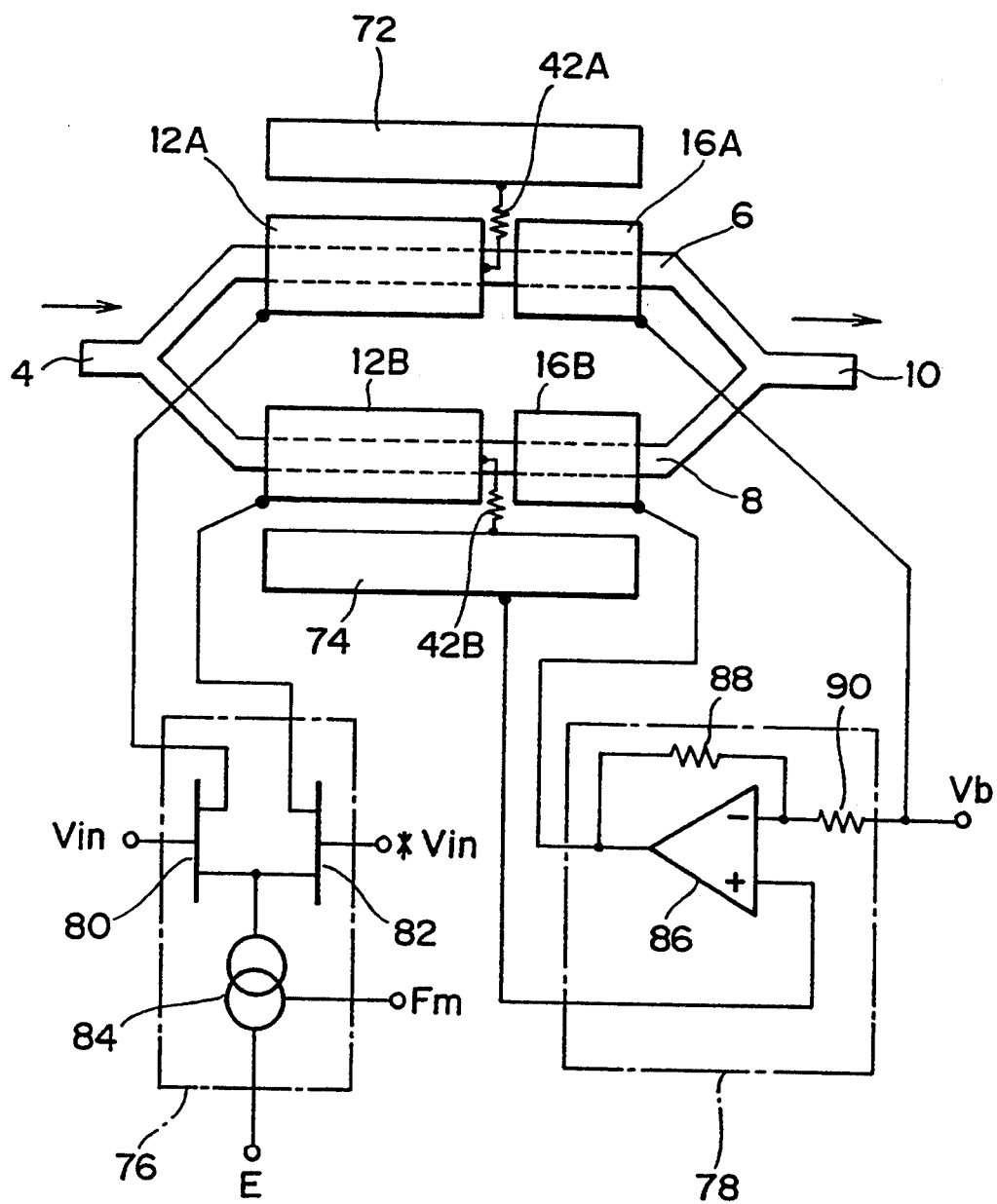
FIG. 13 is a schematic view depicting key parts of an optical transmitter practiced as a second embodiment the invention.

FIG. 13 schematically depicts key parts of an optical transmitter practiced as the second embodiment of the invention. Whereas the first embodiment of FIG. 11 has only one signal electrode 12, the second embodiment comprises signal electrodes 12A and 12B which correspond respectively to the branching waveguides 6 and 8. Bias electrodes 16A and 16B are provided so as to apply bias voltages to the branching waveguides 6 and 8, respectively. Reference numerals 72 and 74 are grounding electrodes; 76 is a driving circuit; 78 is an inverting circuit; 80 and 82 are transistors constituting a differential amplifier; 84 is a current source; 86 is an operational amplifier; and 88 and 90 are resistors. The grounding electrodes 72 and 74 are interconnected, although the connection is not shown in FIG. 13. The driving circuit 76 is connected in a DC setup to the terminals on one end of the signal electrodes 12A and 12B. A terminating resistor 42A is furnished in a DC setup between the signal electrode 12A and the grounding electrode 72, and a terminating resistor 42B is provided also in a DC setup between the signal electrode 12B and the grounding electrode 74. A bias voltage Vb for operating point control is fed to the bias electrode 16A, and a bias voltage inverted by the inverting circuit 78 is applied to the bias electrode 16B Thus supplying the signal electrodes 12A and 12B with driving signals causes the electric between signal electrode 12A and grounding electrode 72 to be sent to the branching waveguide 6, and also causes the electric field between signal electrode 12B and grounding electrode 74 to be fed to the branching waveguide 8. Likewise, giving the bias voltages to the bias 16A and 16B causes the electric field between bias electrode 16A and grounding electrode 72 to be supplied to the branching waveguide 6, and causes the electric field between bias electrode 16B and grounding electrode 74 to be applied to the branching waveguide 8. Because the gates of the transistors 80 and 82 are supplied respectively with an input signal $V_{in}$ and an inverted input signal $*V_{in}$ and because the signal electrodes 12A and 12B are connected in a DC setup to the drains of the transistors 80 and 82 respectively, the signal electrodes 12A and 12B are fed with driving signals that are opposite to each other in phase. With a low-frequency signal $F_m$ fed to the current source 84 to which a voltage E is applied, the driving signal coming from the driving circuit 76 and corresponding to the input signal is modulated by the low-frequency signal $F_m$. The light supplied to the input port 4 from a light source, not shown, is modulated in phase in accordance with the driving signals while being transmitted through the branching waveguides 6 and 8. At the output port 10, the two light streams converge in phase or opposite to each other in phase. This reinforces or cancels the intensity of the two light streams, yielding an intensity-modulated light beam. Where the low-frequency signal $F_m$ is superimposed onto the driving signals and where the operating point of the optical modulator is kept optimum, the resulting light beam is one which is modulated in amplitude with a frequency twice the frequency fm of the low-frequency signal $F_m$. Thus the modulated light is rid of the component of the low-frequency signal $F_m$. Because an operating point shift of the optical modulator will cause the component of the low-frequency signal $F_m$ to be included in the modulated light, the bias voltage Vb is applied so as to minimize the component of the low-frequency signal $F_m$. In this manner, the operating point is kept optimum.

Figure 14:
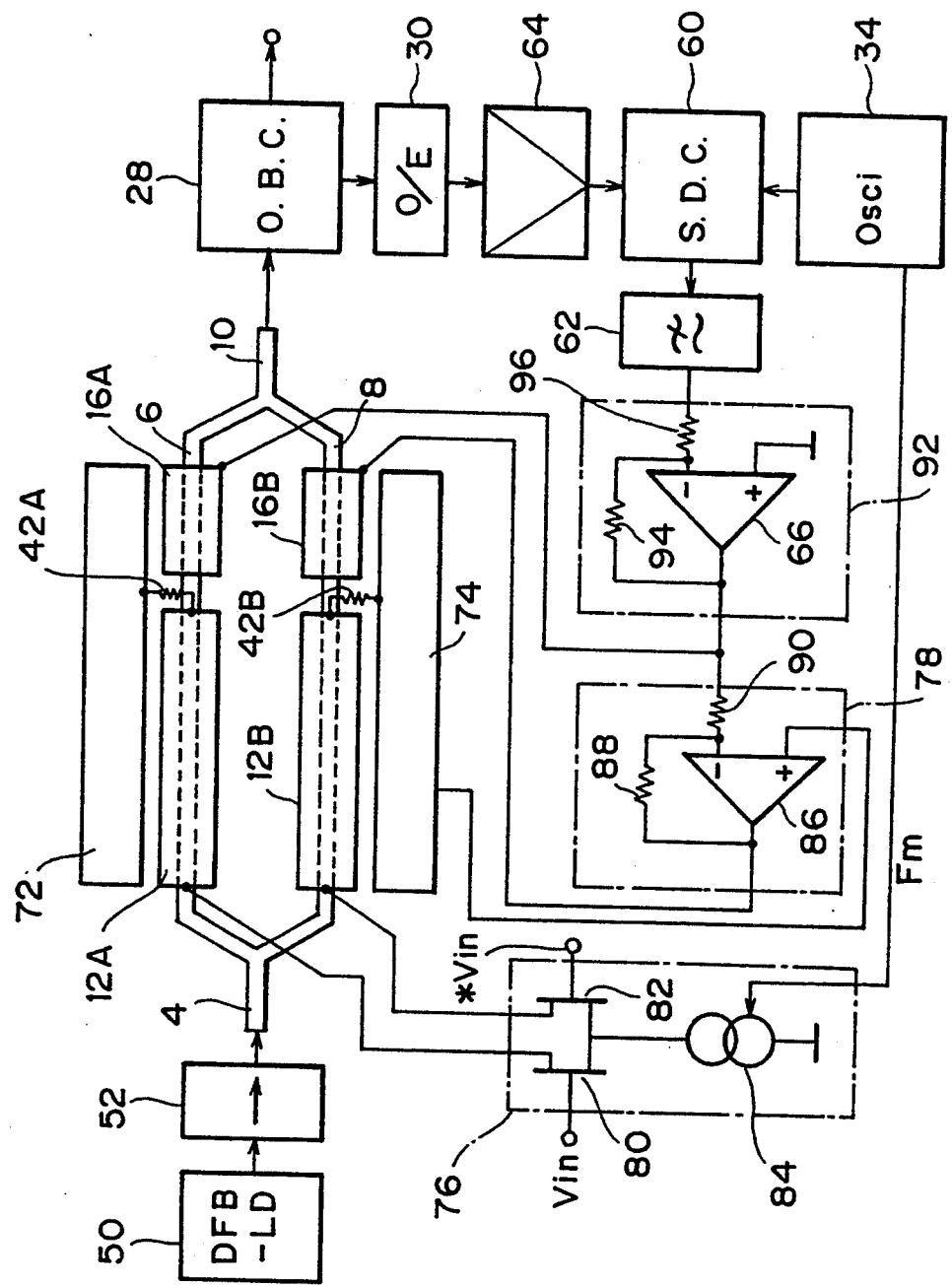
FIG. 14 is a block diagram of the entire optical transmitter of FIG. 13.

FIG. 14 is a block diagram of the entire optical transmitter of FIG. 13. In addition to the structure of FIG. 13, the optical transmitter of FIG. 14 further includes a distributed feedback laser diode 50 that serves as the light source, an optical isolator 52, an optical branching circuit 28, an optical-to-electrical signal converter 30, an amplifier 64, a synchronous detecting circuit 60, a low-pass filter 62, a proportional circuit 92, and an oscillator 34. The proportional circuit 92 contains an operational amplifier 66 and resistors 94 and 96. The optical-to-electrical signal converter 30, amplifier 64, synchronous detecting circuit 60, low-pass filter 62, proportional circuit 92, inverting circuit 78 and oscillator 34 constitute operating point control means. A current source 84 in a driving circuit 76 serves as a low-frequency superimposing circuit.

The light from the laser diode 50 is fed to the input port 4 of the optical modulator via the optical isolator 52. The output port 10 of the optical modulator outputs modulated light. Part of the modulated light is branched by the optical branching circuit 28 and is sent to the optical-to-electrical signal converter 30 for conversion to an electrical signal. After conversion, the electrical signal is synchronously detected by the synchronous detecting circuit 60 using a low-frequency signal from the oscillator. The synchronously detected signal is output as a DC signal. The DC signal is supplied to the proportional circuit 92 via the low-pass filter 62. A bias voltage Vb output by the proportional circuit 92 is fed unmodified to a bias electrode 16A. A bias voltage inverted by the inverting circuit 78 is supplied to a bias electrode 16B.

Figure 15A:
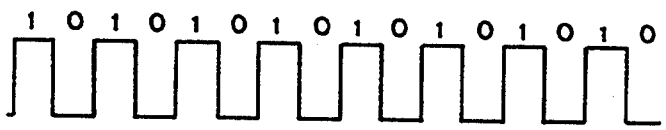
FIGS. 15A through 15G are views of waveforms generated by the optical transmitter of FIG. 14 as it is operating.
Figure 15B:
Figure 15C:
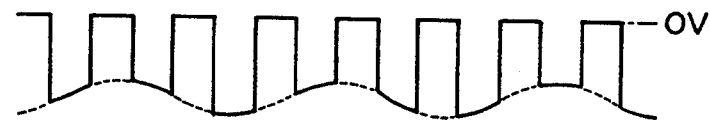
Figure 15D:
Figure 15E:
Figure 15F:
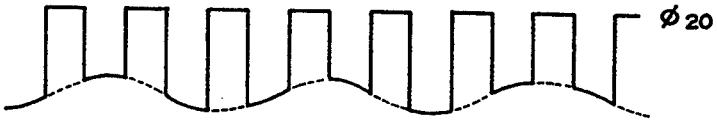
Figure 15G:
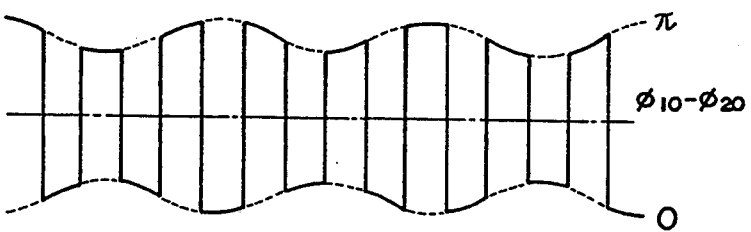

FIGS. 15A through 15G are views of waveforms generated by the optical transmitter of FIG. 14 when the transmitter is in operation. FIG. 15A shows a waveform of an input signal $V_{in}$ with 1's and 0's alternated; FIG. 15B depicts a waveform of a low-frequency signal $F_m$; FIG. 15B portrays a waveform of a driving signal fed to one of signal electrodes 12A; FIG. 15D illustrates a waveform of driving signal supplied to the other signal electrode 12B; FIG. 15E is a waveform of an output phase $\phi_1$ of one of the branching waveguides 6; FIG. 15F shows a waveform of an output phase $\phi_2$ of the other branching waveguide 8; and FIG. 15G sketches a waveform of the phase difference ($\phi_1-\phi_2$) between the optical outputs from the branching waveguides 6 and 8. As evident from FIGS. 15C and 15D, the driving signal fed to the signal electrode 12A is opposite in phase to the driving signal sent to the signal electrode 12B. As shown in FIG. 15G, the phase difference ($\phi_1-\phi_2$) between the optical outputs from the branching waveguides 6 and 8 is in fact the phase difference between zero and $\pi$. The center of that phase difference is given as ($\phi_{10}-\phi_{20}$), where $\phi_{10}$ and $\phi_{20}$ are reference phases for the optical outputs of the branching waveguides 6 and 8, respectively. When these optical outputs converge on the output port 10, an intensity-modulated light beam is obtained.

The second embodiment shown in FIG. 13 or 14 supplies the signal electrodes 12A and 12B with driving signals that are opposite to each other in phase so as to create a predetermined phase difference (zero or $\pi$) between the transmitted light outputs from the branching waveguides 6 and 8. This lowers the driving voltage of the optical modulator and virtually eliminates the chirping thereof. Because the second embodiment of FIG. 14 implements symmetrical modulation with no need for a capacitor as in the case of the first embodiment of FIG. 11, the second embodiment provides stable operating point control against any abrupt change in the mark rate and improves the signal waveform.

Figure 16:
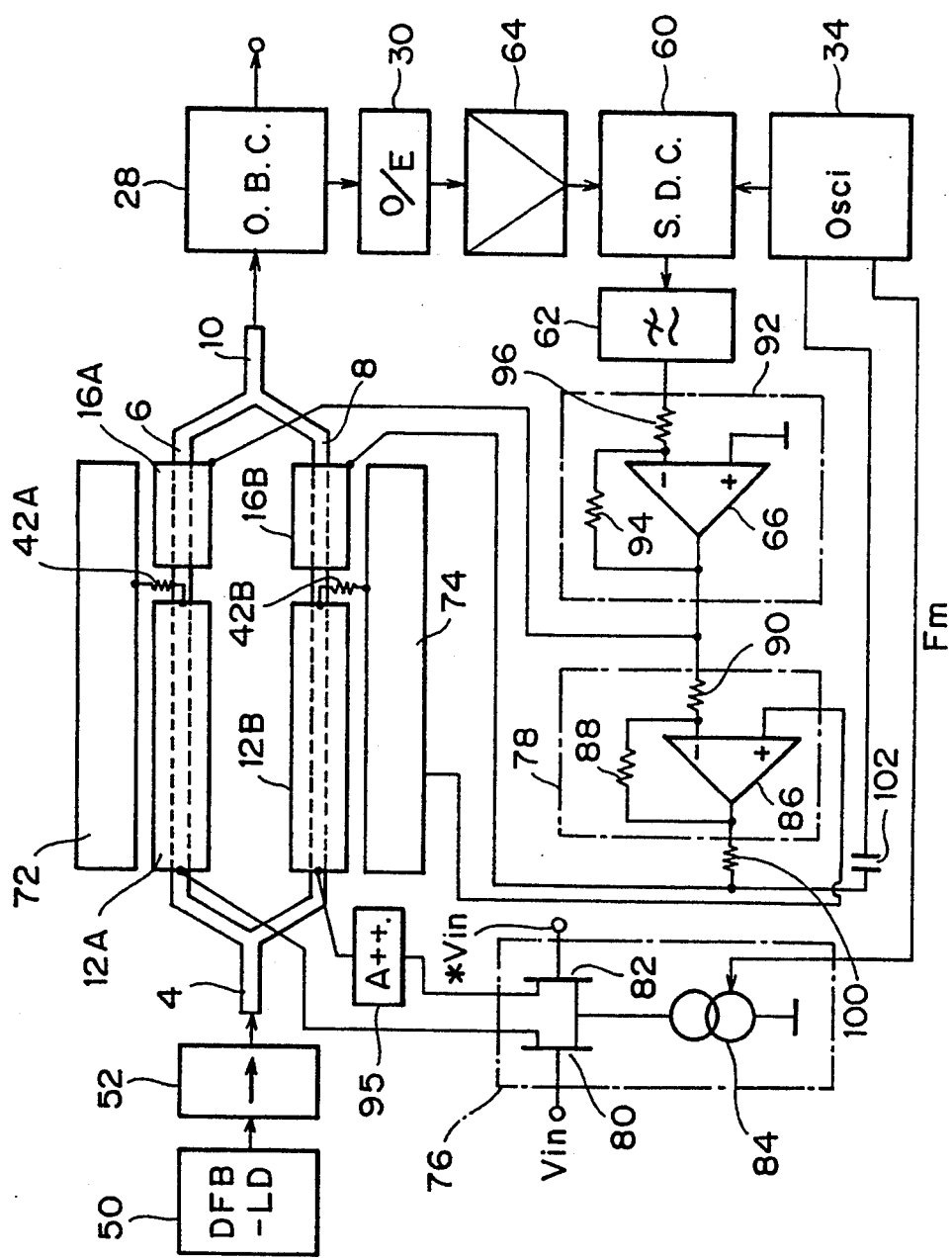
FIG. 16 is a block diagram of an optical transmitter practiced as a third embodiment of the invention.

FIG. 16 is a block diagram of an optical transmitter practiced as the third embodiment of the invention. The third embodiment differs from the second embodiment of FIG. 14 in the following aspects: One of the transistors 82 in the differential amplifier of the driving circuit 76 outputs a driving signal that is attenuated by an attenuator 98 before being fed to the signal electrode 12B. An inverted bias voltage from the inverting circuit 78 is supplied via a resistor 100 to the bias electrode 16B on the same side as the signal electrode 12B. In addition, the bias electrode 16B is supplied through a coupling capacitor 102 with a low-frequency signal from the oscillator 34.

Figure 17:
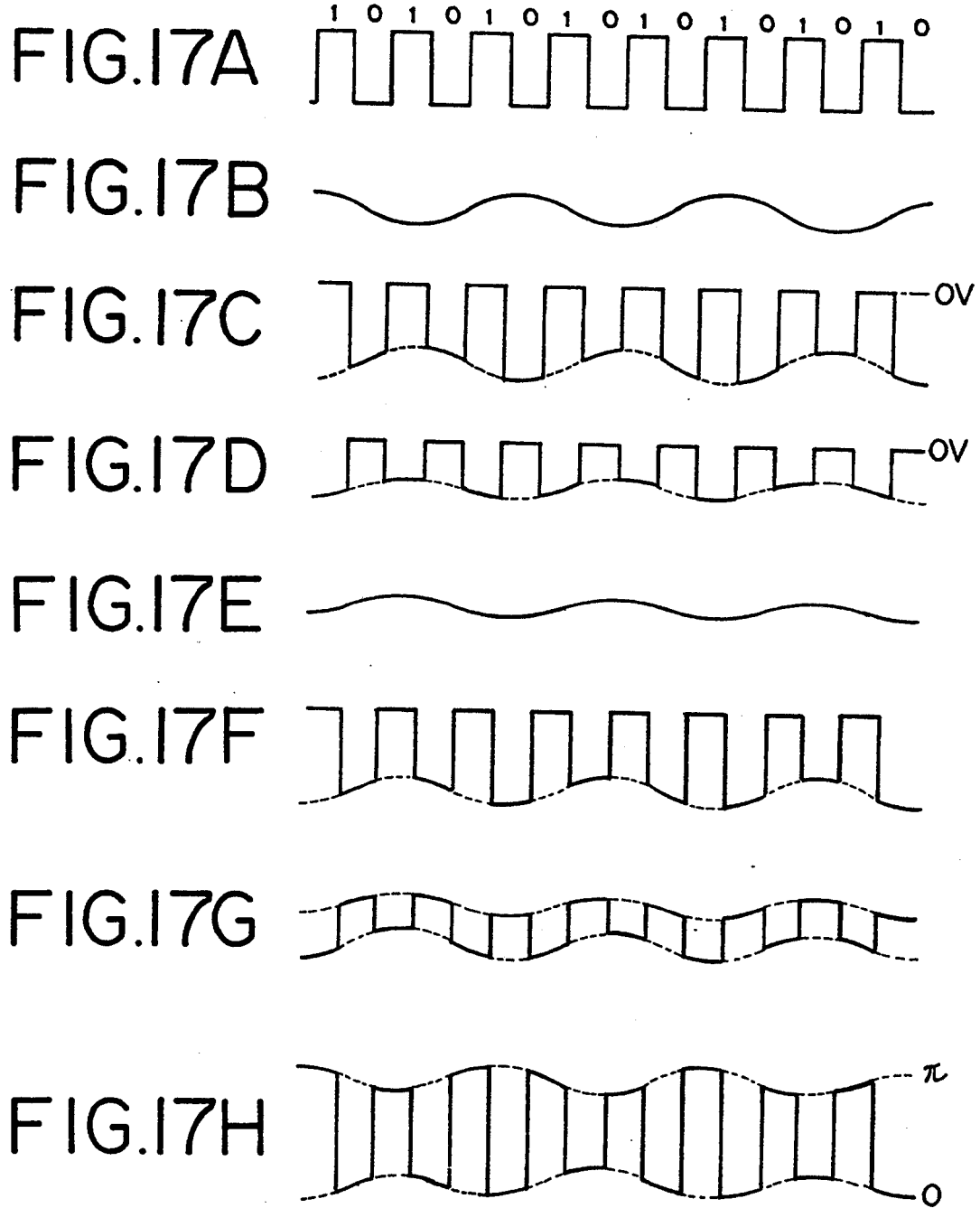
FIGS. 17A through 17H are views of waveforms generated by the optical transmitter of FIG. 16 as it is operating.

FIGS. 17A through 17H are views of waveforms generated by the optical transmitter of FIG. 16 when the transmitter is in operation. FIG. 17A shows a waveform of an input signal $V_{in}$ with 1's and 0's alternated; FIG. 17B depicts a waveform of a low-frequency signal $F_m$; FIG. 17C portrays a waveform of a driving signal fed to the signal electrode 12A; FIG. 17D illustrates a waveform of a driving signal supplied to the signal electrode 12B; FIG. 17E is a waveform of a low-frequency signal fed to the bias electrode 16B; FIG. 17F shows a waveform of the phase $\phi_1$ of the output light from the branching waveguide 6; FIG. 17G illustrates a waveform of the phase $\phi_2$ of the output light from the branching waveguide 8; and FIG. 17H sketches a waveform of the phase difference ($\phi_1-\phi_2$) between the optical outputs from the branching waveguides 6 and 8. The amplitude of FIG. 17C is set to be greater than that of FIG. 15C so that the sum of the amplitude of FIG. 17C and that of FIG. 17D will equal the sum of the amplitude of FIG. 15C and that of FIG. 15D. As shown in FIG. 17D, the driving signal fed to the signal electrode 12B is attenuated by the attenuator 98. Thus the change in the phase $\phi_2$ of the output light from the branching waveguide 8 becomes smaller than the change in the phase $\phi_1$ of the output light from the branching waveguide 6, as indicated in FIG. 17G. With the low-frequency signal supplied to the bias electrode 16B, the phase $\phi_2$ varies depending on that low-frequency signal. As shown in FIG. 17H, the phase difference ($\phi_1-\phi_2$) between the optical outputs from the branching waveguides 6 and 8 falls between zero and $\pi$, and the output port 10 outputs an intensity-modulated light beam. As with the second embodiment of FIG. 14, the third embodiment permits stable operating point control against the change of the mark rate, reduces the waveform deterioration, and lowers the driving voltage of the optical modulator. In contrast to the second embodiment of FIG. 14, the third embodiment keeps unbalanced its driving signals that are fed to the signal electrodes 12A and 12B so that chirping is created in the Night output by the optical modulator. This cancels the adverse effects of wavelength dispersion over optical fiber cables where the polarity of the dispersion predetermined.

Figure 18:
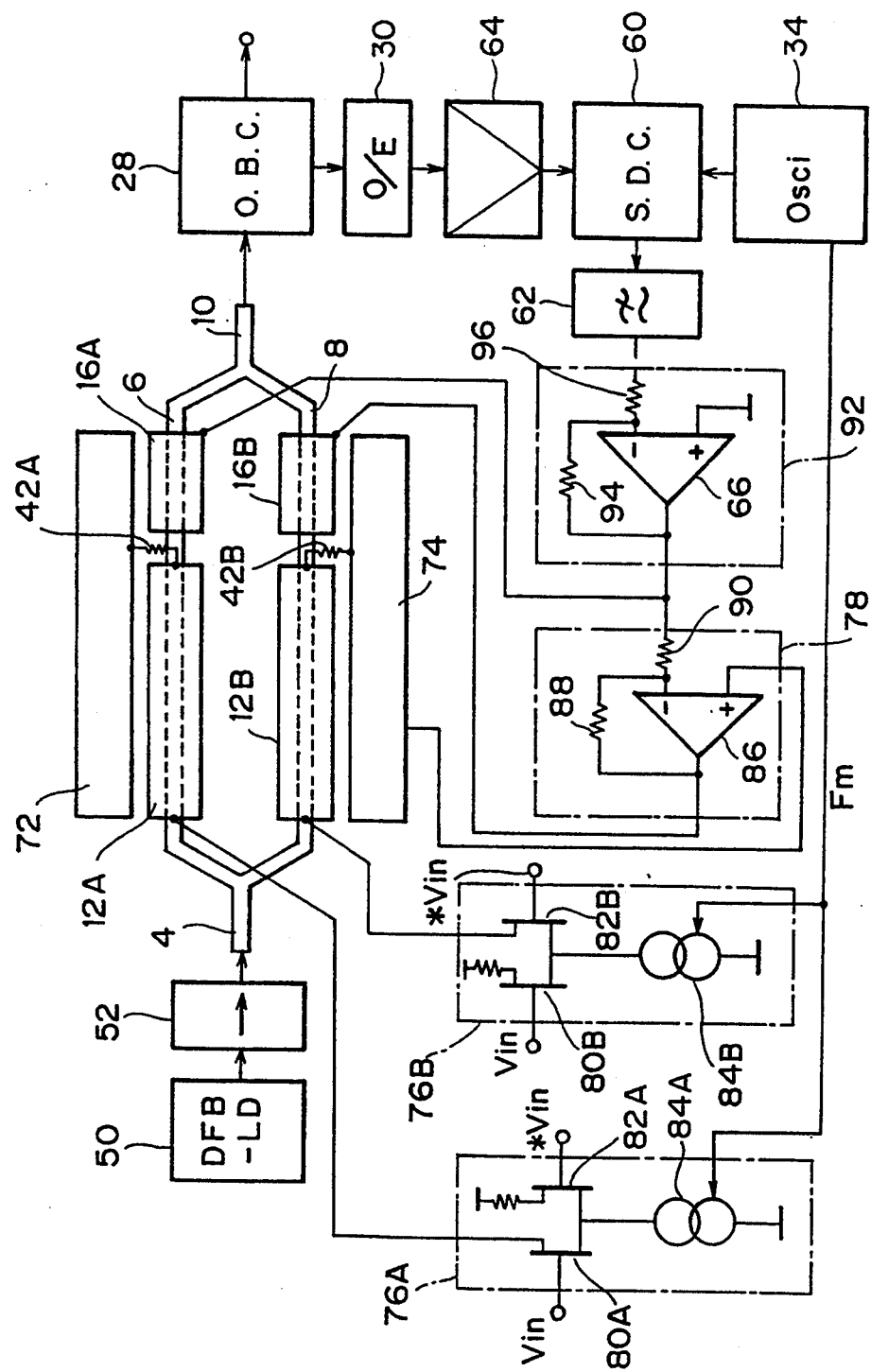
FIG. 18 is a block diagram of an optical transmitter practiced as a fourth embodiment of the invention.

FIG. 18 is a block diagram of an optical transmitter practiced as the fourth embodiment of the invention. As opposed to the second embodiment of FIG. 14, the fourth embodiment is characterized by the provision of mutually independent driving circuits 76A and 76B that feed signals to signal electrodes 12A and 12B. The gates transistors 80A and 82A constituting a differential amplifier in the driving circuit 76A are supplied respectively with an input signal $V_{in}$ and an inverted input signal $*V_{in}$. The drain of the transistor 80A is connected in DC setup to the signal electrode 12A. The gates of transistors 80B and 82B constituting a differential amplifier in the driving circuit 76B are fed respectively with the input signal $V_{in}$ and the inverted input signal $*V_{in}$. The drain of the transistor 80B is connected in a DC setup to the signal electrode 12B The low-frequency signal $F_m$ from the oscillator 34 is applied to two current sources: one current source 84A for the transistors 80A and 22A, the other current source 84B for the transistors 80B and 82B. When the driving circuits 76A and 76B are designed to have the same characteristics, the optical transmitter of FIG. 18 works in the same way as that of FIG. 14. Where the driving circuits 76A and 76B are made to from each other in characteristics through the use of such parameters as the maximum current values of the current sources 84A and 84B, chirping is deliberately created.

Figure 19A:
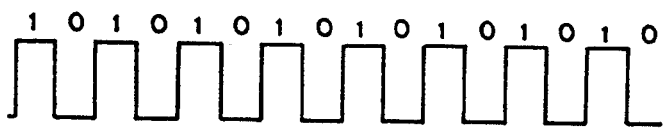
Figure 19C:
Figure 19D:
Figure 19E:
Figure 19F:
Figure 19G:
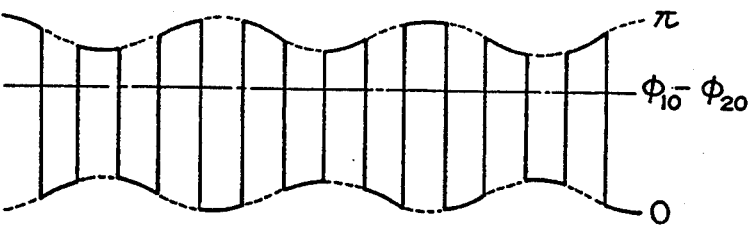

FIGS. 19A through 19G are views of waveforms generated by the optical transmitter of FIG. 18 when the transmitter is in operation. FIG. 19A shows a waveform off an input signal $V_{in}$ with 1's and 0's alternated; FIG. 19B depicts a waveform of a low-frequency signal fed to the signal portrays a waveform of a driving signal fed to the signal electrode 12A; FIG. 19D illustrates a waveform of a driving signal supplied to the signal electrode 12B; FIG. 19E shows a waveform of the phase $\phi_1$ of the output light from the branching waveguide 6; FIG. 19F illustrates a waveform of the phase $\phi_2$ of the output light from the branching waveguide 8; and FIG. 19G sketches a waveform of the phase difference $(\phi_1-\phi_2)$ between the optical outputs from the branching waveguides 6 and 8. These waveforms are in effect when the driving circuits 76A and 76B differ from each other in characteristics. As with the second embodiment of FIG. 14 the fourth embodiment permits stable operating point control against the abrupt change of the mark rate, improves the waveform deterioration, and lowers the driving voltage of the optical modulator. Because two mutually independent driving circuits are provided, the same transmitter structure is capable of addressing both the provision of chirping and the removal thereof. Thus the optical transmitter in an optical transmission system is readily optimized in characteristics by taking into account the characteristics of the target optical fiber for optical signal transmission. As described, the first through the fourth embodiments of the invention provide an optical transmitter that performs stable modulation based on high-speed input signals of at least several Gb/s.

Described below are other preferred embodiments particularly suited for reducing the driving voltage of the optical modulator. Generally, the Mach-Zehnder optical modulator utilizing the phase change of the transmitted light through branching waveguides is not necessarily noted for a significant amount of phase change (i.e., phase modulation efficiency) with respect to the unit voltage applied to the branching waveguides. It follows that this type of optical modulator may have to possess a high driving voltage characteristic so as to implement modulation at a desired intensity level. Although tile driving voltage may be lowered by constructing elongated branching waveguides, that construction leads to a bulky optical modulator. Because the phase modulation efficiency of the branching waveguides varies with polarization modes of the transmitted light, it is necessary to enter the light of one of two polarization modes (generally the mode of the higher phase modulation efficiency). This requires a complicated optical arrangement. Such dependency on the polarization mode is eliminated conventionally by setting the driving voltage of the optical modulator such a manner that the driving voltage for turning on and off the optical modulator in one polarization mode coincide with the driving voltage for turning on and off the optical modulator in the other polarization mode. However, driving voltages for meeting the above requirement are generally too high to be practical. Furthermore, once the driving voltage is established, the optical modulator can only operate on a specific optical wavelength because the operating conditions of the optical modulator vary with the wavelength of the light used.

Accordingly, an object of the embodiments described below is to provide an optical transmitter having an optical modulator which has low driving voltage levels and which is conducive to being downsized. Another object of the embodiments that follow is to provide an optical transmitter having an optical modulator which has low driving voltage levels and which is free from the dependency on any polarization mode. A further object of the embodiments below is to provide an optical transmitter having an optical modulator which has low driving voltage levels and which operates on diverse wavelengths of the signal light.

At least one of the objects above will be achieved by any one of the fifth through the ninth embodiments of the invention to be described below.

Figure 20:
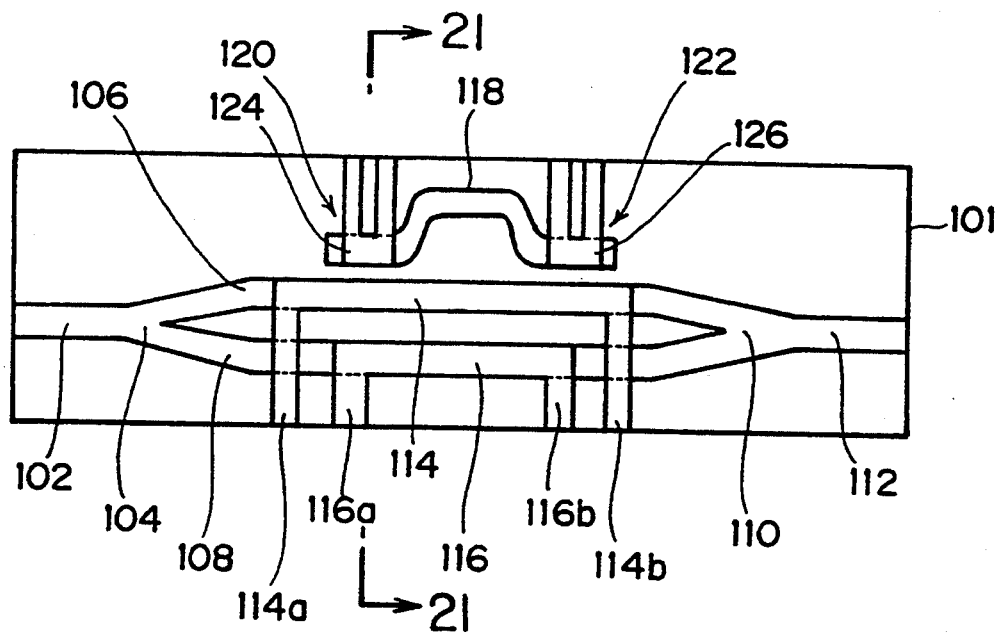
FIG. 20 is a plan view of an optical modulator for use with an optical transmitter practiced as a fifth embodiment of the invention.
Figure 21:
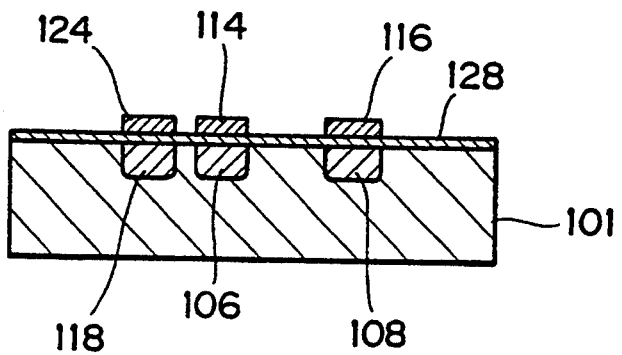
FIG. 21 is a cross-sectional view taken on line B—B of the optical modulator of FIG. 20.

FIG. 20 is a plan view of an optical modulator for use with an optical transmitter practiced as the fifth embodiment of the invention, and FIG. 21 is a cross-sectional view taken on line B—B of the optical modulator in FIG. 20. Reference numeral 101 is a waveguide substrate made of such ferroelectric electro-optical substance as $LiNbO_3$ or $LiTaO_3$. A dopant such as titanium (Ti) is thermally dispersed onto the surface of the waveguide substrate 101 so as to create an optical waveguide arrangement made of two Y-shaped branches combined as shown. The optical waveguide arrangement comprises an input-side optical waveguide 102, a first branching portion 104 that branches in two directions the light transmitted through the input-side optical waveguide 102, a first and a second branching waveguide 106 and 108 both carrying the light, a second branching portion 110 that converges branched light streams, and an output-side optical guide 112 that transmits the converged light. The first and the second branching waveguides 106 and 108 are loaded respectively with a first and a second loaded electrode 114 and 116. The input terminals 114a and 116a of the loaded electrodes 114 and 116 receive input signals of, say, the microwave band. The output terminals 114b and 116b of the loaded electrodes 114 and 116 are connected illustratively to a 50-ohm terminating resistor each, not shown. Reference numeral 118 is a curved delay optical waveguide located alongside off the first branching waveguide 106. Both ends of the delay optical waveguide 118 approach the first branching waveguide 106 in a parallel manner, forming directional couplings 120 and 122 respectively. The coupling ratio of the directional couplings 120 and 122 is controlled using control electrodes 124 126 attached to these couplings of the delay optical waveguide 118. As shown in FIG. 21 more detail, each electrode is loaded on the optical waveguides with a buffer layer 128 furnished therebetween. The buffer layer 128 is not shown in FIG. 20 in order to maintain the visibility of other key components. As with the loaded electrodes 114 and 116, the control electrodes 124 and 126 are built as a traveling-wave type each.

Below is a description of how the coupling off optical power takes place at the directional couplings 120 and 122. Consider the case off FIG. 22A in which two optical waveguides are furnished close to and in parallel with each other. In this case, assume that the two waveguides are called a first waveguide 130A and a second waveguide 130B and that the first and the second waveguides light in a first and a second mode, respectively. The amplitudes of the first and the second modes are values $a_1$ and $a_2$ normalized in such a way that each of these values in absolute notation, when doubled, equals the mode power. Assume also that $n_a$ and $n_b$ denote the refractive indices of the first and the second waveguides 130A and 130B that $n_c$ represents the refractive index of the cladding portion. When the direction off light transmission is taken on the Z-axis, the following expressions calculate infinitesimal changes $\Delta a_1$ and $\Delta a_2$ of the mode amplitudes $a_1$ and $a_2$ in effect when light is transmitted over an infinitesimal distance of $\Delta z$:

$$\Delta a_1 = -i\beta_1 \Delta z a_1 + c_{12} a_2 \Delta z$$

$$\Delta a_2 = -i\beta_2 \Delta z a_2 + c_{21} a_1 \Delta z \tag{11}$$

where, $\beta_1$ is the transmission constant of the first mode, $\beta_2$ is the transmission constant of the second mode, $c_{12}$ is the coupling coefficient that applies across the second mode to the first mode, and $c_{21}$ is the coupling coefficient that applies across the first mode to the second mode. The following set of differential equations is derived from the above set of expressions (11):

$$\frac{da_1}{dz} = -i\beta_1 a_1 + c_{12} a_2 \tag{12}$$

$$\frac{da_2}{dz} = -i\beta_2 a_2 + c_{21} a_1$$

Described below is how a certain relationship occurs between the coupling coefficients $c_{12}$ and $c_{21}$ if there is no optical loss in the waveguides 130A and 130B. First, the total power P of the light transmitted through the two waveguides is given as $$P = 2(|a_1|^2 + |a_2|^2)$$

By differentiating both sides of the expression above, one gets:

$$\frac{dP}{dz} = z\left(a_1 \frac{da_1^*}{dz} + a_1^* \frac{da_1}{dz} + a_2 \frac{da_2^*}{dz} + a_2^* \frac{da_2}{dz}\right) \tag{13}$$

where, asterisks (*) indicate a conjugate complex number each. From the sets of expressions (12) and (13), the following expression is derived:

$$\frac{dP}{dz} = 2[(c_{12}^* + c_{21})a_1 a_2^* + (c_{12} + c_{21}^*)a_1^* a_2] \tag{14}$$

If the waveguides 130A and 130B cause no optical loss, the right-hand side of Expression (14) equals zero according to the law of power conservation. Thus one gets the expression:

$$c_{12} = -c_{21}^* \tag{15}$$

By eliminating $a_2$ from the set of expressions (12) and using Expression (15) above, one gets the following differential equation:

$$\frac{d^2 a_1}{dz^2} + i(\beta_1 + \beta_2)\frac{da_1}{dz} - (\beta_1 \beta_2 - |c_{12}|^2) a_1 = 0 \tag{16}$$

Solving Expression (16) under the initial condition of the mode amplitude when $z=0$, one gets the following expressions:

$$a_1(z) = \left[\left(\cos\beta_b z - i\frac{\beta_d}{\beta_b}\sin\beta_b z\right)a_1 + \right. \tag{17}$$

$$\left. \frac{c_{12}}{\beta_b}\sin\beta_b z a_2(0)\right]\exp[-i\beta_a z]$$

$$a_2(z) = \left[\frac{c_{21}}{\beta_b}\sin\beta_b z a_1(0) + \right.$$

$$\left. \left(\cos\beta_b z + i\frac{\beta_d}{\beta_b}\sin\beta_b z\right)a_2(0)\right]\exp[-i\beta_a z]$$

where, $\beta a$, $\beta b$ and $\beta d$ are defined as follows:

$$\beta_a = \frac{\beta_1 + \beta_2}{2}, \beta_d = \frac{\beta_1 - \beta_2}{2}$$

$$\beta_b = \sqrt{\left(\frac{\beta_1 - \beta_2}{2}\right)^2 + |c_{12}|^2}$$

Suppose that light power enters only the first waveguide 130A and no light power enters the second waveguide 130B where $z=0$. that is, the assumption is that $$2|a_1(0)|^2 = 1,$$

$$2|a_2(0)|^2 = 0$$

Inserting the above expressions in the set of expressions (17) allows the power $P_1(z)$ and $P_2(z)$ of the first and the second waveguides to be calculated as follows:

$$P_1(z) = 2|a_1(z)|^2 = 1 - F\sin^2\beta_b z$$

$$P_2(z) = 2|a_2(z)|^2 = F\sin^2\beta_b z \quad (18)$$

where, F is defined by the expression:

$$F = \frac{1}{1 + \left(\frac{\beta_2 - \beta_2}{2|c_{12}|}\right)^2} \quad (\leq 1) \quad (19)$$

Figure 22A:
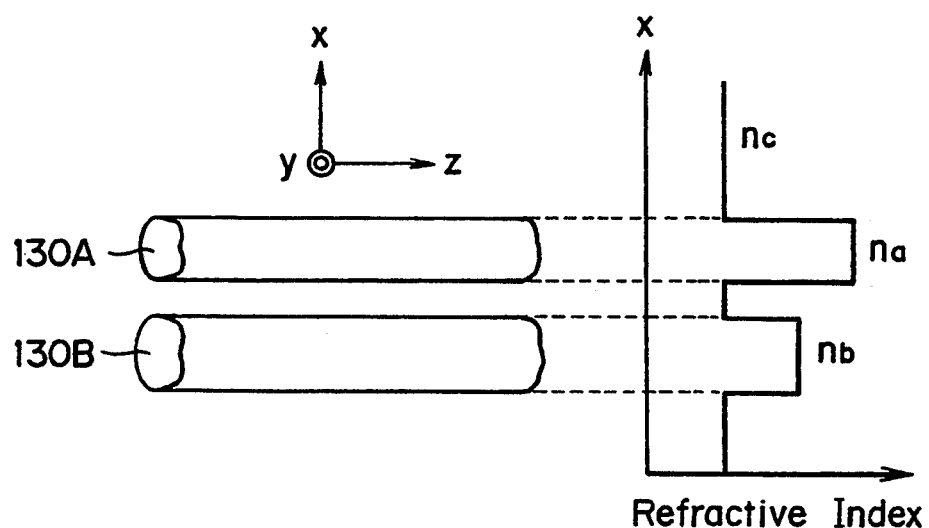
FIGS. 22A and 22B are views showing how optical coupling is accomplished at a directionally coupled part in connection with the invention.
Figure 22B:
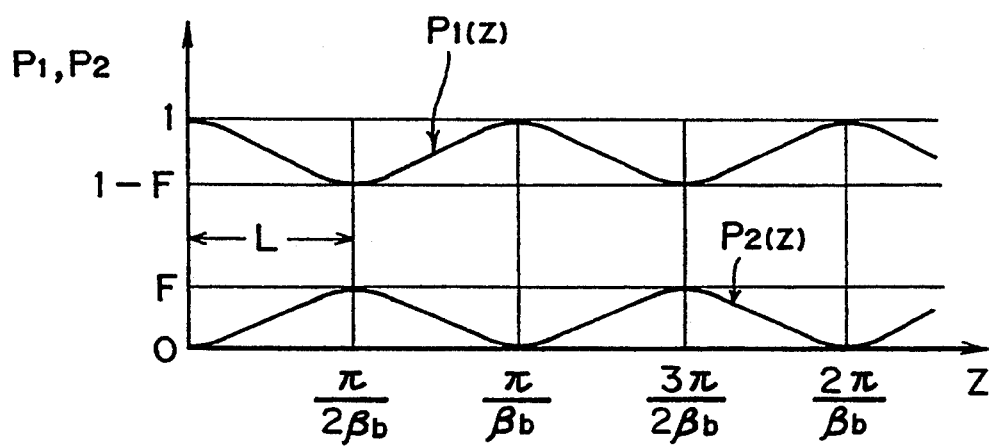

Converting the set of expressions (18) into graphic form provides the view of FIG. 22B. The condition to be met for moving all power from one waveguide to the other, i.e., the condition for accomplishing perfect coupling (i.e., phase matching condition) is $$\beta_1 = \beta_2$$

The length (perfect coupling length) L for affording perfect coupling is given as $$L = \pi/2|c_{12}|$$

In the end, the coupling coefficient $c_{12}$ of the directional coupling shown in FIG. 22A is given by the expression:

$$c_{12} = -\frac{\pi}{2} \frac{c\epsilon_0}{\lambda} \int\int_{-\infty}^{\infty} E_1^*(x, y)[n_a^2(x, y) - n_c^2(x, y)] \times E_2(x, y) dx dy$$

where, c is the velocity of light, $\epsilon_0$ is the dielectric constant of a vacuum, A is the wavelength of light, $E_1(x, y)$ is the mode field distribution of the first waveguide, $E_2(x, y)$ is the mode field distribution of the second waveguide, $n_a$ is the refractive index of the first waveguide 130A, and $n_c$ is the refractive index of the cladding portion. Because the coupling coefficient $c_{12}$ depends on the wavelength and mode of light, that dependency is utilized as the relationship for determining the coupling length in accordance with the wavelength and mode of the light employed.

Meanwhile, the value F in Expression (19) is made smaller by enlarging $|\beta_1 - \beta_2|/|c_{12}|$. Therefore, the coupling ratio of the directional coupling is switched between 0% and 100% on a low driving voltage by varying the refractive index in such a manner that the coupling coefficient $c_{12}$ is made smaller or the difference $|\beta_1 - \beta_2|$ between mode transmission constants is made greater.

For the optical modulator of FIG. 20 to reduce its driving voltage requires the following conditions to he met on a given wavelength of light: When the logic level of the input signal is Low, the coupling ratio of the directional couplings 120 and 122 should be 100% and the electric fields of the two light streams going from the first and the second branching waveguides 106 and 108 into the second branching portion 110 should be opposite phase; when the logic level of the input signal is High, the coupling ratio of the directional couplings 120 and 122 should be 0% and the electric fields of the two light streams going from the first and the second branching waveguides 106 and 108 into the second branching portion 110 should coincide in phase. These conditions are met by suitably establishing the optical path length of the delay optical waveguide 118 and by appropriately controlling the voltages fed to the first loaded electrode 114, the second loaded electrode 116 and the control electrodes 124 and 126. Below is a more specific description of how all this may be accomplished.

Figure 23:
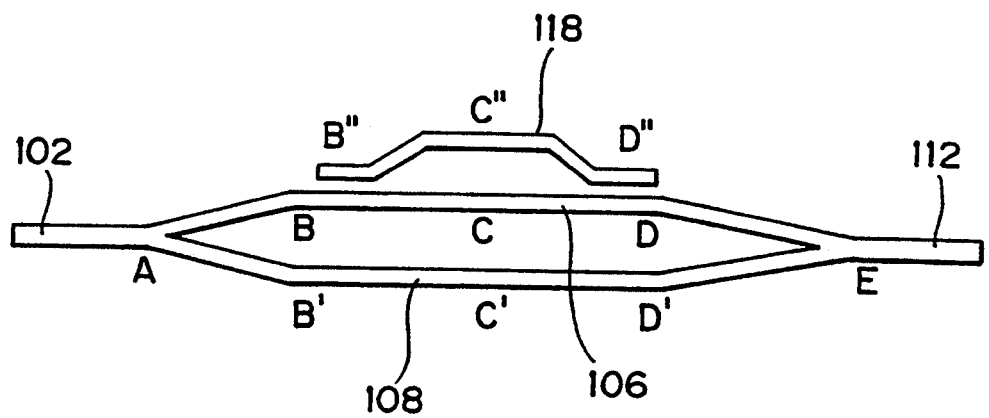
FIG. 23 is a view depicting how optical transmission paths are switched in the optical modulator of FIG. 20.

The optical transmission path of the optical modulator in FIG. 20 varies depending on the voltages given to the control electrodes 124 and 126 (in practice, voltages are fed across the control electrodes 124 and 126 to the first loaded electrode 114) in the manner described below. FIG. 23 depicts how optical transmission paths are switched illustratively in the optical modulator of FIG. 20. For the ease of explaining the transmission paths with reference to FIG. 23, reference character A stands for the first branching portion 104; B and D denote the directional couplings of the first branching waveguide 106; C designates a given point between B and D; and E indicates the second branching portion 110. Those points of the second branching waveguide 108 which correspond to the above points B, C and D are denoted by B', C' and D', and those of the delay optical waveguide 118 by B", C" and D". It is assumed that the optical modulator is turned upon voltage application and turned off when voltages are removed. The optical path lengths for the respective transmission paths are designed as follows: The optical path length of A→Bk→C→D→E is L; the optical path length of A→B'→C'→D'→E is L; and the optical path length of A"→B"→C"→D"→E is L+ (half of the wavelength). With no voltage applied, the directional coupling of a perfect coupling length is constructed so that 100% power transition will occur from B to B" and from D" to D. Then when no voltages are fed, the following two optical transmission paths are formed:

(1) A→B"→C"→D"→E
(2) A→B'→C'→D'→E

As a result, an optical path difference corresponding to half the wavelength occurs between the above paths (1) and (2). Interference between the transmitted light streams at point E turns off the output of the optical modulator.

Where voltages are applied so as to inhibit the power transition at the directional coupling, the following two optical transmission paths are formed:

(1) A→B→C→D→E
(2) A→B'→C'→D'→E

The optical path difference between the two paths becomes zero, which turns on the output of the optical modulator.

The description above applies where the optical path difference between the path A→B→C→D→E and the path A→B'→C'→D'→E is either zero or an integer multiple of the wavelength involved. In either case, there is no need to apply voltages between the first and the second loaded voltages 114 and 116. However, technical constraints on manufacturing optical waveguides may sometimes make it difficult to establish the necessary optical path difference. In that case, the difficulty is circumvented by voltage application between the first and the second loaded voltages 114 and 116.

To turn on the output of the optical modulator requires having a phase difference of $2k\pi$ (k is an integer) between the two light streams entering the second branching portion 110, whereas to turn off the output requires securing a phase difference of $(2k+1)\pi$ (k is an integer) between the two light streams going into the second branching portion 110. These requirements are met by applying a compensating voltage across the first loaded electrode 114 to the second loaded electrode 116. The compensating voltage required here is sufficiently low.

As an alternative to the setup described above, the following conditions can be adopted on a given wavelength of light: When the logic level of the input signal is High, the coupling ratio of the directional couplings 120 and 122 may be 100% and the electric fields of the two light streams going from the first and the second branching waveguides 106 and 108 into the second branching portion 110 may be opposite in phase; when the logic level of the input signal is Low, the coupling ratio of the directional couplings 120 and 122 may be 0% and the electric fields of the two light streams going from the first and the second branching waveguides 106 and 108 into second branching portion 110 may coincide in phase As another alternative to the setup described above, the following conditions can be adopted on a given wavelength of light: When the coupling ratio of the directional couplings 120 and 122 may be 100% and the electric fields of the two light streams going from the first and the second branching waveguides 106 and 108 into the second branching portion 110 may coincide in phase; when the logic level of the input signal is High, the coupling ratio of the directional couplings 120 and 122 may be 0% and the electric fields of the two light streams going from the first and the second branching waveguides 106 and 108 into the second branching portion 110 may be opposite in phase.

As a further alternative to the setup described above, the following conditions can be adopted on a given wavelength of light: When the logic level off the input signal is High, the coupling ratio of the directional couplings 120 and 122 may be 100% and the electric fields of the two light streams going from the first and the second branching waveguides 106 and 108 into the second branching portion 110 may coincide in phase; when the logic level of the input signal is Low, the coupling :ratio of the directional couplings 120 and 122 may be 0% and the electric fields of the two light streams going from the first and the second branching waveguides 106 and 108 into the second branching portion 110 may be opposite in phase.

Figure 24:
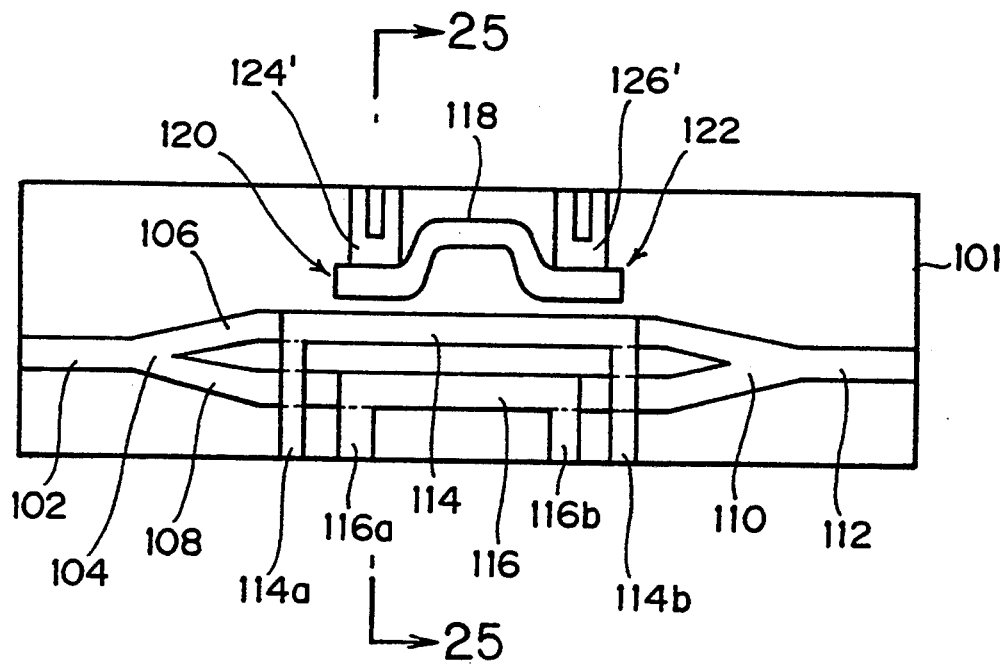
FIG. 24 is a plan view of an optical modulator for use with an optical transmitter practiced as a sixth embodiment of the invention.
Figure 25:
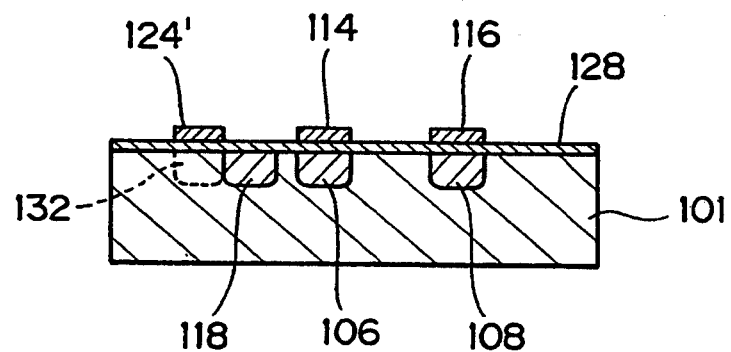
FIG. 25 is a cross-sectional view taken on line C—C off the optical modulator in FIG. 24.

FIG. 24 is a plan view of an optical modulator for use with an optical transmitter practiced as the sixth embodiment of the invention, and FIG. 25 is a cross-sectional view taken on line C—C of that optical modulator. In the sixth embodiment, the directional couplings 120 and 122 are furnished respectively with control electrodes 124' and 126' located close to the delay optical waveguide 118. These control electrodes are fed with voltages such a manner that the refractive index of a region 132 directly under the electrodes 124' and 126' on the waveguide substrate 101 will equal the refractive index of the delay optical waveguide 118. When voltages are fed to the control electrodes, this setup enlarges substantially the width of the delay optical waveguide 118 at the directional couplings 120 and 122. Thus the coupling ratio is controlled as needed. Because there is no need to provide a buffer layer, driving voltages are further reduced.

Figure 26:
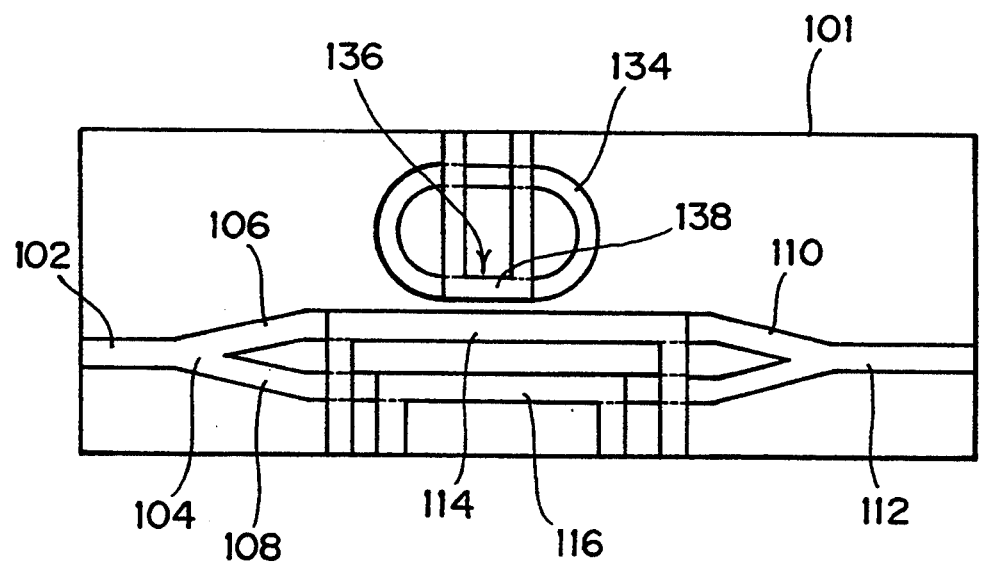
FIG. 26 is a plan view of an optical modulator for use with an optical transmitter practiced as a seventh embodiment of the invention.

FIG. 26 is a plan view of an optical modulator for use with an optical transmitter practiced as the seventh embodiment of the invention. In the seventh embodiment, the curbed delay optical waveguide of the fifth embodiment in FIG. 20 is replaced by a ring type optical waveguide 134 that is directionally coupled to the first branching waveguide 106. Part of the ring type optical waveguide 134 at the directional coupling 136 is loaded with a control electrode 138. In the seventh embodiment, the following conditions are met on a given wavelength of light: When the logic level of the input signal is Low, the coupling ratio of the directional coupling 136 should be 100% and the electric fields of the two light streams going from the first and the second branching waveguides 106 and 108 into the second branching portion 110 should be opposite in phase; when the logic level of the input signal is High, the coupling ratio of the directional coupling 136 should be 0% and the electric fields of the two light streams going from the first and the second branching waveguides 106 and 108 into the second branching portion 110 should coincide in phase. These requirements are met by suitably establishing the optical path length of the ring type optical waveguide 134 and by appropriately controlling the voltages fed to the first loaded electrode 114, the second loaded electrode 116 and the control electrode 138.

If the optical modulator of FIG. 20 or 26 is made of Z-cut $LiNbO_3$, necessary operational characteristics are obtained preferably by entering a TM mode light beam having a polarization plane perpendicular to the substrate surface. If a TE mode light beam having a polarization plane in parallel with the substrate is entered, the phase modulation efficiency of that light beam is lower than that of the TM mode light beam. This requires establishing different operating conditions. In that case, it is difficult to drive the optical modulator on low voltages. With the optical modulator of FIG. 20 or 26, the difficulty is bypassed by not having to designate the polarization mode of the incident light as follows:

With the optical modulator of FIG. 20, voltages are supplied to the control electrodes 124 and 126 in such a manner that the coupling ratio of the directional couplings 120 and 122 will be 100% for the polarization mode (TE mode) in which the phase modulation efficiency of the first and the second branching waveguides 106 and 108 is low, and that the coupling ratio will be 0% for the polarization mode (TM mode) in which the phase modulation efficiency is high. Furthermore, the optical path length of the delay optical waveguide 118 is determined so that the electric fields of the light streams in the two modes going from the first branching waveguide 106 into the second branching portion 110 will coincide in phase. This arrangement allows voltages fed to the loaded electrodes 114 and 116 to turn on and off the optical modulator when TM mode is in effect and affords phase change to supplement the loss in the delay optical waveguide 118 when TE mode is in effect. In this manner, efficient intensity modulation is made possible without regard to the polarization mode of the incident light. Where the optical modulator of FIG. 26 is used, the voltages fed to the control electrodes are controlled and the optical path length of the ring type optical waveguide 184 is established so that the electric fields of the light beams in the two modes going from the first branching waveguide 106 into the second branching portion 110 will coincide in phase, as with the optical modulator of FIG. 20.

Figure 27:
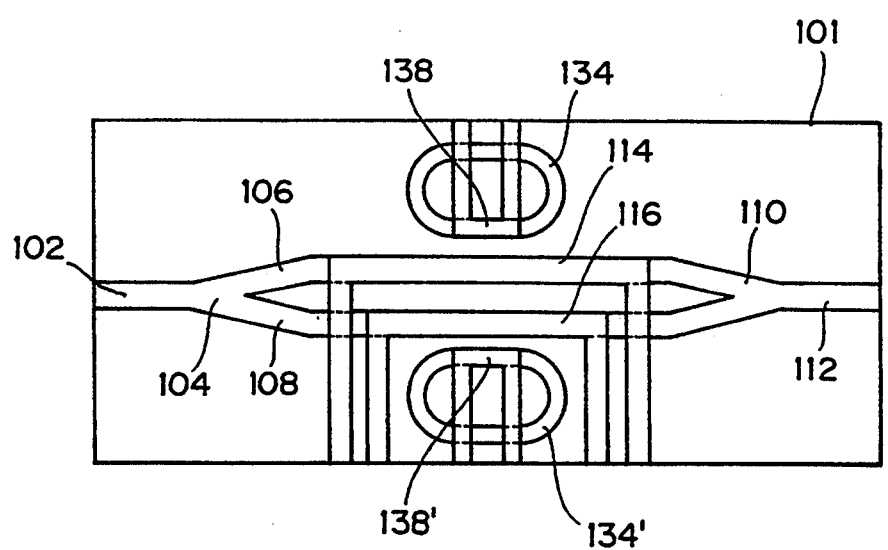
FIG. 27 is a plan view of an optical modulator for use with an optical transmitter practiced as an eighth embodiment of the invention.

FIG. 27 is a plan view of an optical modulator for use with an optical transmitter practiced as the eighth embodiment of the invention. In the eighth embodiment, the construction of FIG. 26 is supplemented by another ring type optical waveguide 134' coupled directionally to the second branching waveguide 108. This arrangement is intended to address any manufacturing error in the optical path length of the ring type optical waveguide 134 in FIG. 27. The coupling ratio of the directional coupling is controlled by the voltage fed to the control electrode 138'. With the construction of FIG. 20, the manufacturing error in the optical path length of the delay optical waveguide 118 may be addressed by directionally coupling another delay optical waveguide, not shown, to the second branching waveguide 108 and by suitably controlling the coupling ratio of that directional coupling.

Figure 28:
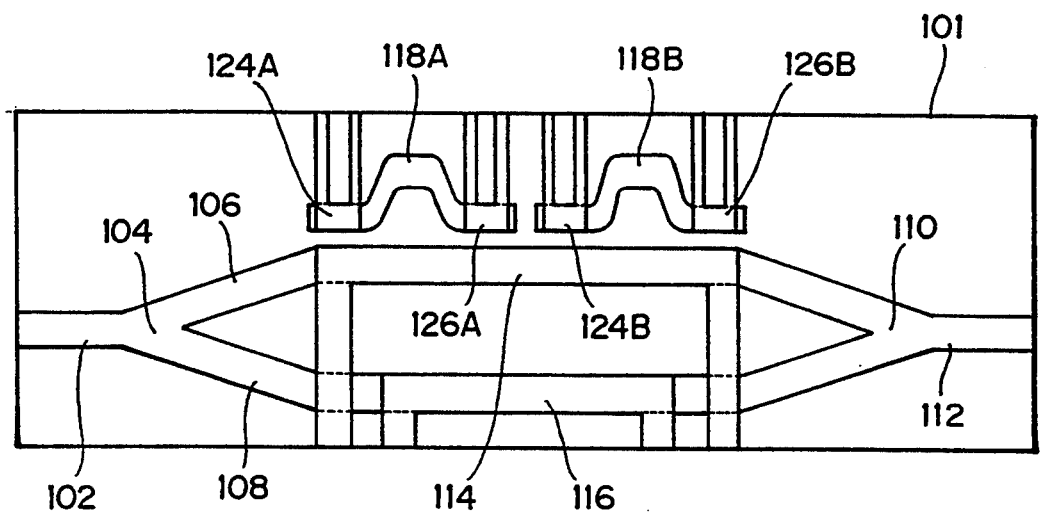
FIG. 28 is a plan view of an optical modulator for use with an optical transmitter practiced as a ninth embodiment of the invention.

FIG. 28 is a plan view of an optical modulator for use with an optical transmitter practiced as the ninth embodiment of the invention. This embodiment is a variation of the fifth embodiment in FIG. 20 and is capable of operating on a predetermined plurality of wavelengths. The ninth embodiment comprises two delay optical waveguides 118A and 118B, both ends of which are directionally coupled to the first branching waveguide 106. The resulting directional couplings are furnished with control electrodes 124A, 126A, 124B and 126B. For the ninth embodiment, the following conditions should be met: The directional couplings of the delay optical waveguide 118A should have a coupling ratio of 100% given the light of a first wavelength (e.g., 1.3 $\mu$m) when no control voltage is supplied. The directional couplings of the delay optical waveguide 118B should have a coupling ratio of 100% given the light of a second wavelength (e.g., 1.55 $\mu$m) different from the first wavelength, with no control voltage supplied. In addition, the optical path lengths of the delay optical waveguides 118A and 118B are to be established so that the optical modulator will be turned on and off given the light of any one the first and the second wavelengths. The above arrangement permits intensity modulation by use of the light of either the first or the second wavelength, thereby enhancing the versatility of the optical modulator. Where the light of both the first and the second wavelengths is entered in order to operate the optical modulator, wavelength division multiplexing transmission and wavelength division bidirectional transmission are readily made available. There may be three or more delay optical waveguides included in the construction of FIG. 28. The delay optical waveguides may be replaced by a ring type optical waveguide.

Although the description above contains many specificities, these should not be construed as limiting the scope of the invention but as merely providing illustrations of some of the presently preferred embodiments of this invention. For example, with the fourth embodiment off FIG. 18, capabilities to permit the choice of either the presence or the absence of chirping may be added easily to eliminate the adverse effects of wavelength dispersion where the polarity of the wavelength dispersion over optical fiber cables is known beforehand.

Thus the scope of the invention should be determined by the appended claims and their legal equivalents, rather than by the examples given.

What is claimed is:

1. An optical modulator comprising:
   an optical interferometer type modulating means having an input port which receives light from a light source, a first and a second branching waveguide which transmit the light supplied to said input port after branching the supplied light in two directions, an output port which converges the branched light from said first branching waveguide and said second branching waveguide before outputting the converged light, and a signal electrode and a bias electrode which are insulated form each other and which give a phase change to the light transmitted through said first branching waveguide and said second branching waveguide;
   driving means directly connected to said signal electrode in a DC setup, for supplying said signal electrode with a driving signal based on an input signal; and
   operating point control means operatively connected to said bias electrode, for supplying said bias electrode with a bias voltage controlled in accordance with the light output from said output port for control of the operating point of said modulating means.

2. An optical modulator according to claim 1, wherein said driving means supplies said signal electrode with said driving signal in such a manner that the light transmitted through said first branching waveguide and said second branching waveguide will be given a phase change which turns on and off the light output from said output port in accordance with the logic level of said input signal; and
   wherein said operating point control means detects the drift of the operating characteristic curve of said modulating means based on the optical intensity level of the light output from said output port, and supplies said bias electrode accordingly with said bias voltage so that the light transmitted through said first branching waveguide and said second branching waveguide will be given a phase change which keeps said operating point positionally constant with respect to said operating characteristic curve.

3. An optical modulator according to claim 2, wherein said operating point control means includes:
   an oscillator for outputting a low-frequency signal;
   a low-frequency superimposing circuit operatively connected to said oscillator, for modulating in amplitude said driving signal using said low-frequency signal;
   an optical-to-electrical signal converter operatively connected to said output port, for converting the light output from said output port into an electrical signal;
   a phase detecting circuit operatively connected to said optical-to-electrical signal converter and to said oscillator, for comparing in phase the frequency component of said low-frequency signal in said electrical signal with said low-frequency signal from said oscillator; said phase detecting circuit further outputting a DC signal the polarity of which is determined by the direction of said drift and of which the level depends on the magnitude of said drift; and
   a bias control circuit, connected operatively to said phase detecting circuit and to said bias electrode, for providing feedback control on said bias voltage so as to bring said DC signal to zero.

4. An optical modulator according to claim 3, comprising means to superimpose an AC signal, in any one of in-and opposite-phase phase conditions with respect to said low-frequency signal and having a predetermined amplitude, onto said bias voltage; and
   wherein the phase and amplitude of said AC signal are determined so that the space-side and mark-side envelopes of a waveform representing any one of phase difference and phase sum between the converging light streams from said first branching waveguide and said second branching waveguide will be opposite in phase and will have the same amplitude.

5. An optical modulator according to claim 1, wherein said signal electrode has a first end portion and a second end portion and is built as a traveling-wave type such that the electric field derived from said driving signal travels in the same direction as the transmitted light through said first branching waveguide and said second branching waveguide;

wherein said driving means is connected to said first end portion in said DC setup; and wherein said modulator further comprises a terminating resistor connected to said second end portion in a DC setup.

6. An optical modulator according to claim 5, wherein said signal electrode is loaded onto any one of said first branching waveguide and said second branching waveguide; and wherein said bias electrode is loaded onto the other branching waveguide.

7. An optical modulator according to claim 5, wherein said signal electrode and said bias electrode are loaded onto any one of said first branching waveguide and said second branching waveguide.

8. An optical modulator according to claim 5, wherein said signal electrode is constituted by a first signal electrode and a second signal electrode which are loaded onto said first branching waveguide and said second branching waveguide, respectively; and wherein said driving means includes means for feeding the driving signal to any one of said first signal electrode and said second signal electrode and inverting the driving signal supplied to the other signal electrode.

9. An optical modulator according to claim 8, wherein said operating point control means includes an oscillator for outputting a low-frequency signal, and a low-frequency superimposing circuit connected operatively to said oscillator for modulating in amplitude said driving signal using said low-frequency signal; and wherein said operating point control means controls said bias voltage in such a manner that the component of said low-frequency signal contained in the output light from said optical modulator will be minimized.

10. An optical modulator according to claim 9, wherein said driving means includes a differential amplifier having a first and a second transistor connected respectively to said first signal electrode and said second signal electrode in a DC setup, and a current source for supplying said differential amplifier with a current; and wherein said current source is modulated by said low-frequency signal.

11. An optical modulator according to claim 10, wherein one of said first and said second transistors is connected direct to one of said first and said second driving electrodes and the other transistor is connected via an attenuator to the other driving electrode; and wherein said bias voltage is supplied to said bias electrode with said low-frequency signal.

12. An optical modulator according to claim 9, wherein said driving means includes a first and a second differential amplifier which are provided respectively for said first signal electrode and said second signal electrode; and wherein said first differential amplifier and said second differential amplifier are provided with current sources which are modulated by use of said low-frequency signal.

13. An optical modulator according to claim 8, wherein said bias electrode is constituted by a first and a second bias electrode which are loaded respectively onto said first branching waveguide and said second branching waveguide; and wherein said operating point control means includes means for feeding the bias voltage to any one of said first bias electrode and said second bias electrode and inverting the bias voltage supplied to the other bias electrode.

14. An optical modulator according to claim 1, wherein said modulating means includes an optical waveguide construction having titanium dispersed in a Z-cut $LiNbO_3$ substrate.

15. An optical modulator according to claim 1, wherein said light source is a laser diode.

16. An optical modulator comprising:

an optical interferometer type modulating means for modulating in intensity light from a light source; and driving means, connected operatively to said modulating means for supplying said modulating means with a driving signal based on an input signal;

said modulating means including:

an input-side optical waveguide;

a first branching portion for branching in two directions the light transmitted through said input-side optical waveguide;

a first and a second branching waveguide for transmitting the light branched by said first branching portion;

a second branching portion for converging the light transmitted through said first branching waveguide and said second branching waveguide;

an output-side optical waveguide for transmitting the light converged by said second branching portion;

a first and second electrode cooperating respectively with said first branching waveguide and said second branching waveguide;

a delay optical waveguide coupled directionally to at least one of said first branching waveguide and said second branching waveguide; and a control electrode for controlling the coupling ratio of the directional coupling between said at least one branching waveguide and said delay optical waveguide.

17. An optical modulator according to claim 16, further comprising control means for controlling control voltages applied to said first electrode and said second electrode as well as to said control electrode by use of said driving signal.

18. An optical modulator according to claim 17, wherein said control means controls said control voltages for a given wavelength of light in such a manner that when the logic level of said input signal is one of a Low and a High level, the coupling ratio of said directional coupling will become 100% and the electric fields of the two light streams going from said first and said second branching waveguides into said second branching portion will be opposite in phase; and that when the logic level of said input signal is the other level, the coupling ratio of said directional coupling will become 0% and the electric fields of the two light streams going from said first and said second branching waveguides into said second branching portion will coincide in phase.

19. An optical modulator according to claim 18, wherein said given wavelength comprises a plurality of wavelengths; and wherein said delay optical waveguide comprises a plurality of waveguides provided respectively for the wavelengths.

20. An optical modulator according to claim 17, wherein said control means controls said control voltages for a given wavelength of light in such a manner that when the logic level of said input signal is one of a Low and a High level, the coupling ratio of said directional coupling will become 100% and the electric fields of the two light streams going from said first and said second branching waveguides into said second branching portion will coincide in phase; and that when the logic level said input signal is the other level, the coupling ratio of said directional coupling will become 0% and the electric fields of the two light streams going from said first and said second branching waveguides into said second branching portion will be opposite in phase.

21. An optical transmitter according to claim 20, wherein said given wavelength comprises a plurality of wavelengths; and wherein said delay optical waveguide comprises a plurality of waveguides provided respectively for the wavelengths.

22. An optical modulator according to claim 16, wherein the voltage applied to said control electrode is controlled in such a manner that the coupling ratio of said directional coupling will become 100% in a polarization mode of low phase modulation efficiency for said first and said second branching waveguides, and that the coupling ratio of said directional coupling will become 0% in a polarization mode of high phase modulation efficiency for said first and said second branching waveguides; and wherein the optical path length of said delay optical waveguide is established in such a manner that the electric fields of the light streams in the two polarization modes going from that one of said first and said second branching waveguides which is connected directionally to said delay optical waveguide into said second branching portion will coincide in phase.

23. An optical modulator according to claim 16, wherein said delay optical waveguide is a ring type optical waveguide.

* * * * *